United States Patent
Tsuchida et al.

(10) Patent No.: US 8,968,939 B2
(45) Date of Patent: Mar. 3, 2015

(54) SOLID ELECTROLYTE MATERIAL, ELECTRODE ELEMENT THAT INCLUDES SOLID ELECTROLYTE MATERIAL, ALL-SOLID BATTERY THAT INCLUDES SOLID ELECTROLYTE MATERIAL, AND MANUFACTURING METHOD FOR SOLID ELECTROLYTE MATERIAL

(75) Inventors: Yasushi Tsuchida, Susono (JP); Koji Kawamoto, Miyoshi (JP); Yukiyoshi Ueno, Gotenba (JP); Shigenori Hama, Susono (JP); Masato Kamiya, Susono (JP); Hiroshi Nagase, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 605 days.

(21) Appl. No.: 13/318,222

(22) PCT Filed: Apr. 28, 2010

(86) PCT No.: PCT/IB2010/001059
§ 371 (c)(1),
(2), (4) Date: Nov. 30, 2011

(87) PCT Pub. No.: WO2010/125467
PCT Pub. Date: Nov. 4, 2010

(65) Prior Publication Data
US 2012/0094185 A1    Apr. 19, 2012

(30) Foreign Application Priority Data

May 1, 2009   (JP) .................................. 2009-112030
Jan. 19, 2010  (JP) .................................. 2010-009118

(51) Int. Cl.
*H01M 10/0562*   (2010.01)

(52) U.S. Cl.
CPC .. *H01M 10/0562* (2013.01); *H01M 2300/0068* (2013.01); *H01M 2300/008* (2013.01); *Y02E 60/122* (2013.01)
USPC ........... 429/314; 429/316; 429/317; 429/321; 429/322; 429/304

(58) Field of Classification Search
CPC .................................................... H01M 10/0562
USPC .................. 429/314, 316, 317, 321, 322, 304
See application file for complete search history.

(56) References Cited

U.S. PATENT DOCUMENTS

| | | | |
|---|---|---|---|
| 4,331,750 A | 5/1982 | Malugani et al. | |
| 4,585,714 A | 4/1986 | Akridge | |

(Continued)

FOREIGN PATENT DOCUMENTS

| | | |
|---|---|---|
| CN | 101065327 A | 10/2007 |
| CN | 102668219 A | 9/2012 |

(Continued)

OTHER PUBLICATIONS

Fuminori Mizuno et al.: "Design of composite positive electrode in all-solid-state secondary batteries with $Li_2S$—$0P_2S_5$ glass-ceramic electrolytes", Journal of Power Sources, vol. 146, pp. 711-714 (2005).

(Continued)

*Primary Examiner* — Helen O Conley
(74) *Attorney, Agent, or Firm* — Sughrue Mion, PLLC

(57) ABSTRACT

A solid electrolyte material that can react with an electrode active material to forms a high-resistance portion includes fluorine.

12 Claims, 10 Drawing Sheets

FIRST EXAMPLE

NEW PEAK IS PRESENT AROUND 190 ppm IN EXAMPLES

(56) References Cited

U.S. PATENT DOCUMENTS

| | | | |
|---|---|---|---|
| 4,599,284 | A | 7/1986 | Akridge |
| 5,085,953 | A | 2/1992 | Akridge et al. |
| 5,227,148 | A | 7/1993 | Akridge et al. |
| 2001/0036577 | A1 | 11/2001 | Nakane et al. |
| 2007/0160911 | A1 | 7/2007 | Senga et al. |
| 2008/0057399 | A1 | 3/2008 | Visco et al. |
| 2009/0081553 | A1 | 3/2009 | Kondo et al. |
| 2009/0081554 | A1 | 3/2009 | Takada et al. |
| 2010/0112440 | A1 | 5/2010 | Guyomard et al. |
| 2011/0167625 | A1 | 7/2011 | Hama et al. |
| 2012/0231348 | A1 | 9/2012 | Ohtomo et al. |

FOREIGN PATENT DOCUMENTS

| | | | |
|---|---|---|---|
| EP | 2131421 | A1 | 12/2009 |
| JP | 62-008467 | A | 1/1987 |
| JP | 04-231346 | A | 8/1992 |
| JP | 05-306117 | A | 11/1993 |
| JP | 05-306118 | A | 11/1993 |
| JP | 05-306119 | A | 11/1993 |
| JP | 11-144523 | A | 5/1999 |
| JP | 2002-109955 | A | 4/2002 |
| JP | 2003-217663 | A | 7/2003 |
| JP | 2004-206942 | A | 7/2004 |
| JP | 2005-228570 | A | 8/2005 |
| JP | 2008-103280 | A | 5/2008 |
| JP | 2008-198620 | A | 8/2008 |
| JP | 2009-117168 | A | 5/2009 |
| JP | 2010-80168 | A | 4/2010 |
| JP | 2010-146936 | A | 7/2010 |
| JP | 2010-170715 | A | 8/2010 |
| WO | 2006/045922 | A1 | 5/2006 |
| WO | 2007/004590 | A1 | 1/2007 |
| WO | 2009/078138 | A1 | 6/2009 |
| WO | 2010/038313 | A1 | 4/2010 |
| WO | 2010/064127 | A1 | 6/2010 |
| WO | 2010/106412 | A1 | 9/2010 |
| WO | 2011/064662 | A1 | 6/2011 |

OTHER PUBLICATIONS

Yusuke Fukushima et al.: "Fabrication of electrode-electrolyte interface in all-solid-state lithium batteries using the thermal softening-adhesion behavior of $Li_2S$—$P_2S_5$ glass electrolytes", Proceedings of the meeting of materials for chemical batteries, vol. 9, pp. 51-52 (2008).

John H. Kennedy et al.: "Further Characterization of $SiS_2$—$Li_2S$ Glasses Doped with Lithium Halide", Journal of the Electrochemical Society, vol. 135, No. 4, Apr. 1988, pp. 859-862.

John H. Kennedy et al.: "Glass-Forming Region and Structure in $SiS_2$—$Li_2S$—LiX (X= Br, I)", Journal of Solid State Chemistry, vol. 69, No. 2, Aug. 1987, pp. 252-257.

John H. Kennedy et al.: "Preparation and Conductivity Measurements of $SiS_2$—$Li_2S$ Glasses Doped With LiBr and LiCl", vol. 18-19, Jan. 1986, pp. 368-371.

Rene Mercier et al.: "Superionic Conduction in $Li_2S$—$P_2S_5$—LiI—Glasses", Solid State Ionics, vol. 5, 1981, pp. 663-666.

Naoko Tomei et al.: "Preparation of Amorphous Materials in the system LiI—$Li_2S$—$P_2S_5$ by Mechanical Milling and Their Lithium Ion Conducting Properties", Summary of Solid State Ionics, vol. 23, 2003, pp. 26-27.

Narumi Ohta et al.: $LiNbO_3$-coated $LiCoO_2$ as cathode material for all solid-state lithium secondary batteries, Science Direct, Electrochemistry Communications 9 (2007), pp. 1486-1490.

Chowdari B V R et al.: "Electrical and electrochemical characterization of $Li_2O$:$P_2O_5$:$Nb_2O_5$-based solid electrolytes", Journal of Non-Crystalline Solids, North-Holland Physics Publishing, Amsterdam, Netherlands, LNKD-DOI:10.1016/0022-3093(89)90187-7, vol. 110, No. 1, Jul. 1, 1989, pp. 101-110, XP024063984, ISSN 0022-3093.

International Search Report and Written Opinion for corresponding International Patent Application No. PCT/IB2010/001059 mailed Sep. 20, 2010.

Hans-Jörg Deiseroth et al.: $Li_6PS_5X$: A Class of Crystalline Li-Rich Solids With an Unusually High $Li^+$ Mobility, vol. 47, pp. 755-758.

"Ionization Energies of Atoms and Atomic Ions", CRC Handbook of Chemistry and Physics, 94th Edition, Internet Version 2014, pp. 10-197-10-199.

FIRST EXAMPLE

Chemical Shift (ppm)
NEW PEAK IS PRESENT AROUND 40 ppm IN EXAMPLES

SECOND EXAMPLE

Chemical Shift (ppm)

THIRD EXAMPLE

Chemical Shift (ppm)
NEW PEAK IS PRESENT AROUND 40 ppm IN EXAMPLES

FOURTH EXAMPLE

Chemical Shift (ppm)

FIRST COMPARATIVE EXAMPLE

Chemical Shift (ppm)

$LiPF_6$ ONLY

Chemical Shift (ppm)

FIRST EXAMPLE

NEW PEAK IS PRESENT AROUND 190 ppm IN EXAMPLES

SECOND EXAMPLE

THIRD EXAMPLE

NEW PEAK IS PRESENT AROUND 190 ppm IN EXAMPLES

FOURTH EXAMPLE

LiF ONLY

LiPF$_6$ ONLY

SOLID ELECTROLYTE MATERIAL, ELECTRODE ELEMENT THAT INCLUDES SOLID ELECTROLYTE MATERIAL, ALL-SOLID BATTERY THAT INCLUDES SOLID ELECTROLYTE MATERIAL, AND MANUFACTURING METHOD FOR SOLID ELECTROLYTE MATERIAL

BACKGROUND OF THE INVENTION

1. Field of the Invention

The invention relates to a solid electrolyte material used for an all-solid battery, an electrode element that includes a solid electrolyte material, an all-solid battery that includes a solid electrolyte material, and a manufacturing method for a solid electrolyte material.

2. Description of the Related Art

With a rapid proliferation of information-related equipment and communication equipment, such as personal computers, camcorders and cellular phones, in recent years, it becomes important to develop an excellent battery (for example, lithium battery) as a power source of the information-related equipment or the communication equipment. In addition, in fields other than the information-related equipment and the communication-related equipment, for example, in automobile industry, development of lithium batteries, and the like, used for electric vehicles or hybrid vehicles has been proceeding.

Here, existing commercially available lithium batteries employ an organic electrolytic solution that uses a flammable organic solvent. Therefore, it is necessary to install a safety device that suppresses an increase in temperature in the event of a short circuit or improve a structure or a material for short-circuit prevention. In contrast to this, all-solid batteries that replace a liquid electrolyte with a solid electrolyte do not use a flammable organic solvent in the batteries. For this reason, it is considered that the all-solid batteries contribute to simplification of a safety device and are excellent in manufacturing cost or productivity.

Such all-solid batteries include a positive electrode layer, a negative electrode layer and a solid electrolyte layer that is arranged between the positive electrode layer and the negative electrode layer. Thus, when the positive electrode layer is formed by powder molding using only a positive electrode active material, because the electrolyte is solid, it is difficult for the electrolyte to permeate into the positive electrode layer. This reduces the area of the interface between the positive electrode active material and the electrolyte, so battery performance deteriorates. Therefore, a positive electrode mixture formed of a mixture of the powder of a positive electrode active material and the powder of a solid electrolyte material is used to form a positive electrode layer to thereby increase the area of the interface. However, when the positive electrode mixture is used to form a positive electrode layer by powder molding, interface resistance against movement of lithium ions across the interface between the positive electrode active material and the solid electrolyte material tends to increase. It is believed that this is because the positive electrode active material reacts with the solid electrolyte material to thereby form a high-resistance portion on the surface of the positive electrode active material (see Narumi Ohta et al., "LiNbO$_3$-coated LiCoO$_2$ as cathode material for all solid-state lithium secondary batteries", Electrochemistry Communications 9 (2007), pages 1486 to 1490).

A sulfide-based solid electrolyte material is known as a solid electrolyte material. The sulfide-based solid electrolyte material has a high lithium ion conductivity, so it is useful to obtain a high-power battery. For example, Japanese Patent Application Publication No. 2005-228570 (JP-A-2005-228570) describes Li$_2$S—P$_2$S$_5$-based crystallized glass as a sulfide-based solid electrolyte material. However, for the above described reason, even when the lithium ion conductivity of the sulfide-based solid electrolyte material is enhanced, it is still difficult to sufficiently obtain performance when the sulfide-based solid electrolyte material is used for the positive electrode mixture.

Then, in the existing art, there is an attempt to improve the performance of an all-solid battery by focusing on the interface between a positive electrode active material and a solid electrolyte material. For example, Narumi Ohta et al., "LiNbO$_3$-coated LiCoO$_2$ as cathode material for all solid-state lithium secondary batteries", Electrochemistry Communications 9 (2007), pages 1486 to 1490 describes a material in which the surface of LiCoO$_2$ (positive electrode active material) is coated with LiNbO$_3$ (lithium niobate). This technique attempts to obtain a high-power battery in such a manner that the surface of LiCoO$_2$ is coated with LiNbO$_3$ to suppress reaction between LiCoO$_2$ and the solid electrolyte material to thereby reduce the interface resistance between LiCoO$_2$ and the solid electrolyte material.

In addition, it is also known that a negative electrode active material reacts with a solid electrolyte material to form a high-resistance portion on the surface of the negative electrode active material and, therefore, interface resistance against movement of lithium ions across the interface between the negative electrode active material and the solid electrolyte material increases (see Japanese Patent Application Publication No. 2004-206942 (JP-A-2004-206942)). In order to solve the above problem, JP-A-2004-206942 describes an all-solid battery in which a second solid electrolyte layer that has an ion conductivity lower than that of a first solid electrolyte layer (sulfide-based solid electrolyte material) and that does not chemically react with the first solid electrolyte is formed between the first solid electrolyte layer and a negative electrode made of metal lithium. This technique is to form the second solid electrolyte layer to thereby suppress reaction between the sulfide-based solid electrolyte material and the metal lithium.

Narumi Ohta et al., "LiNbO$_3$-coated LiCoO$_2$ as cathode material for all solid-state lithium secondary batteries", Electrochemistry Communications 9 (2007), pages 1486 to 1490 describes a method of coating the surface of LiCoO$_2$ with LiNbO$_3$ in such a manner that a coating solution that contains the precursor of LiNbO$_3$ is applied onto the surface of LiCoO$_2$ (positive electrode active material) and is then subjected to heat treatment in an oxygen atmosphere. In order to suppress reaction between the positive electrode active material and the solid electrolyte material, it is necessary to coat the surfaces of the positive electrode active material particles with LiNbO$_3$, and, in addition, it is desirable to uniformly coat the surfaces of the positive electrode active material particles with thin LiNbO$_3$. The above method may be rolling fluidized coating. However, the rolling fluidized coating is a batch treatment, and the apparatus is large, so there is a problem that manufacturing cost is high. In addition, LiNbO$_3$ has a weak bonding force to the surface of LiCoO$_2$ (positive electrode active material) and easily peels off when it receives shearing force. Because the rolling fluidized coating apparatus has an aggregate crushing mechanism (screen), so it is difficult to completely suppress peeling of LiNbO$_3$.

SUMMARY OF THE INVENTION

The invention relates to a solid electrolyte material that is able to suppress production of a high-resistance portion at an interface with an electrode active material, an electrode element that includes a solid electrolyte material, an all-solid battery that includes a solid electrolyte material, and a manufacturing method for a solid electrolyte material.

A first aspect of the invention provides a solid electrolyte material. The solid electrolyte material that can react with an electrode active material to form a high-resistance portion includes fluorine.

With the first aspect, when the solid electrolyte material that contains fluorine is applied to an all-solid battery, it is conceivable that a metallic element in the electrode active material reacts with fluorine in the solid electrolyte material at a contact portion between the electrode active material and the solid electrolyte material because of the potential of an electrode to thereby form a stable fluoride or the electrochemical stability of the solid electrolyte material itself improves. Thus, it is possible to suppress production of a high-resistance portion at the interface between the electrode active material and the solid electrolyte material.

The solid electrolyte material may be a sulfide-based solid electrolyte material. The sulfide-based solid electrolyte material has an excellent ion conductivity.

The content of the fluorine may range from 0.1 mole percent to 20 mole percent with respect to the solid electrolyte material. If the content of fluorine is excessively high, the ion conductance decreases, and, in addition, even when the content of fluorine is increased, the effect of reducing interface resistance does not further improve. On the other hand, if the content of fluorine is excessively low, the effect of reducing interface resistance cannot be sufficiently obtained.

The solid electrolyte material may have a peak around 190 ppm in F-NMR. For example, when a fluoride and a material composition that contains a constituent element of the solid electrolyte material are used to synthesize the solid electrolyte material, the peak is a new peak that should not be observed from the fluoride used in synthesizing the solid electrolyte material, so the solid electrolyte material is not merely mixed with a fluoride but it may be regarded as the one that is partially fluorinated.

The solid electrolyte material may contain phosphorus (P) as a skeletal element, and may have a peak around 40 ppm in P-NMR. For example, when a fluoride and a material composition that contains a constituent element of the solid electrolyte material are used to synthesize the solid electrolyte material, the peak is a new peak that should not be observed from the skeletal structure of the solid electrolyte material or the fluoride used in synthesizing the solid electrolyte material, so the solid electrolyte material is not merely mixed with a fluoride but it may be regarded as the one that is partially fluorinated.

A second aspect of the invention provides an electrode element. The electrode element includes: an electrode active material; and the above described solid electrolyte material.

The electrode element contains the above described solid electrolyte material, so it is possible to suppress production of a high-resistance portion at the interface between the electrode active-material and the solid electrolyte material. Thus, when the electrode element is used for an all-solid battery, it is possible to reduce interface resistance to thereby suppress a decrease in output.

A surface of the electrode active material may be coated with an oxide. It is possible to further suppress production of a high-resistance portion resulting from the reaction between the electrode active material and the solid electrolyte material.

The oxide may be an ion-conducting oxide. Ions are conducted through the inside of the ion-conducting oxide to make it possible to decrease resistance on the surface of the positive electrode active material.

The ion-conducting oxide may be lithium niobate. The lithium niobate has an excellent lithium ion conductivity, so it is possible to effectively suppress production of a high-resistance portion.

The electrode active material may be a positive electrode active material. Generally, the positive electrode layer has a resistance higher than that of the negative electrode layer, so the above electrode element may be used for the positive electrode layer that contains the positive electrode active material.

In the above case, the positive electrode active material may be an oxide-based positive electrode active material. When the solid electrolyte material is a sulfide-based solid electrolyte material, a metallic element in the oxide-based positive electrode active material tends to be bonded with sulfur rather than oxygen, so the metallic element reacts with sulfur in the sulfide-based solid electrolyte material to form a metal sulfide. The metal sulfide itself becomes a resistance portion, and a deficiency (decomposition) of metal ions and sulfur ions occurs near the interface between the oxide-based positive electrode active material and the sulfide-based solid electrolyte material. Thus, when the oxide-based positive electrode active material that tends to react with the sulfide-based solid electrolyte material is used, it is possible to effectively suppress production of a high-resistance portion.

A third aspect of the invention provides an all-solid battery. The all-solid battery includes: a positive electrode layer; a negative electrode layer; and a solid electrolyte layer that is formed between the positive electrode layer and the negative electrode layer, wherein at least one of the positive electrode layer, the negative electrode layer and the solid electrolyte layer contains the above described solid electrolyte material.

With the third aspect, at least one of the positive electrode layer, the negative electrode layer and the solid electrolyte layer contains the above described solid electrolyte material. Thus, it is possible to suppress production of a high-resistance portion at the interface between the electrode active material and the solid electrolyte material, so it is possible to obtain an all-solid battery that has an excellent durability in usage.

The positive electrode layer may be the above described electrode element. As described above, generally, the positive electrode layer has a resistance higher than that of the negative electrode layer, so the above electrode element may be used for the positive electrode layer that contains the positive electrode active material.

A fourth aspect of the invention provides a manufacturing method for a solid electrolyte material. The manufacturing method includes: adding a fluoride to a material composition that contains a constituent element of the solid electrolyte material; and amorphizing the material composition to which the fluoride has been added.

With the fourth aspect, it is possible to synthesize a solid electrolyte material that contains fluorine, which is able to suppress production of a high-resistance portion at the interface between the solid electrolyte material and an electrode active material, with a simple process at low cost.

The fluoride may contain a skeletal element of the solid electrolyte material. It is conceivable that the fluoride that contains the skeletal element is used to facilitate fluorination of the solid electrolyte material, so it is possible to reduce initial interface resistance.

The fluoride added to the solid electrolyte material may range from 0.1 mole percent to 20 mole percent on a fluorine basis. If the amount of fluoride added is excessively high, the ion conductance decreases, and, in addition, even when the amount of fluoride added is increased, the effect of reducing interface resistance does not further improve. On the other hand, if the amount of fluoride added is excessively low, the effect of reducing interface resistance cannot be sufficiently obtained.

According to the aspects of the invention, it is possible to suppress production of a high-resistance portion at the interface between the electrode active material and the solid electrolyte material, so it is possible to reduce interface resistance and improve durability.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a solid electrolyte material, an electrode element, an all-solid battery and a manufacturing method for a solid electrolyte material according to an embodiment of the invention will be described in detail.

A. Solid Electrolyte Material

The solid electrolyte material according to the present embodiment can possibly react with an electrode active material to form a high-resistance portion, and contains fluorine.

Figure 1:
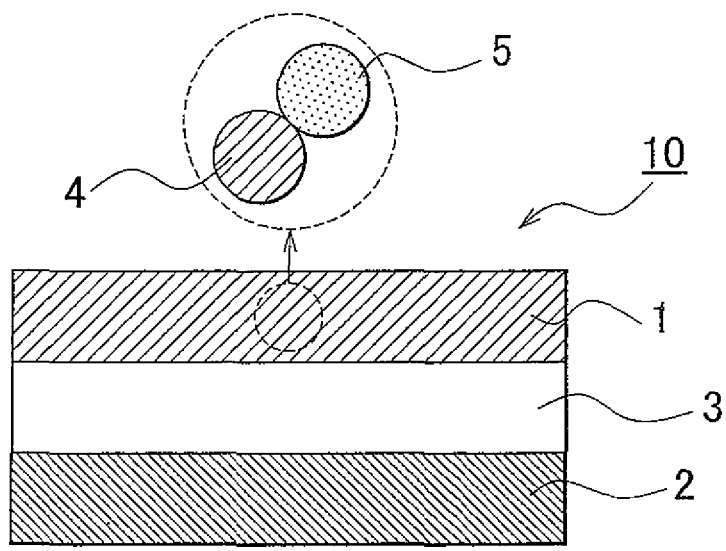
FIG. 1 is a schematic view that shows an example of a power generating element of an all-solid battery according to an embodiment of the invention.

The solid electrolyte material according to the present embodiment will be described with reference to the accompanying drawings. FIG. 1 is a schematic view that shows an example of a power generating element of an all-solid battery that uses the solid electrolyte material according to the embodiment of the invention. The power generating element 10 of the all-solid battery shown in FIG. 1 includes a positive electrode layer 1 (positive electrode mixture layer), a negative electrode layer 2 and a solid electrolyte layer 3. The solid electrolyte layer 3 is formed between the positive electrode layer 1 and the negative electrode layer 2. The positive electrode layer 1 (positive electrode mixture layer) contains a positive electrode active material 4 and a solid electrolyte material 5. The positive electrode active material 4 and the solid electrolyte material 5 are uniformly mixed in the positive electrode layer 1. Although not shown in the drawing, the solid electrolyte material 5 contains fluorine, and fluorine is uniformly dispersed in the solid electrolyte material 5.

As shown in FIG. 1, during charging of the all-solid battery, lithium ions are drawn from the positive electrode active material 4 of the positive electrode layer 1, the lithium ions are conducted to the negative electrode layer 2 through the solid electrolyte material 5 and the solid electrolyte layer 3. In contrast, during discharging of the all-solid battery, lithium ions discharged from the negative electrode layer 2 are conducted to the positive electrode active material 4 through the solid electrolyte layer 3 and the solid electrolyte material 5. In this way, during charging and discharging of the all-solid battery, lithium ions move across the interfaces between the positive electrode active material and the solid electrolyte material. Therefore, to achieve the high-capacity and high-power all-solid battery, it should be considered to reduce the interface resistance.

In the present embodiment, the solid electrolyte material contains fluorine, and fluorine is uniformly dispersed in the solid electrolyte material. Thus, it is possible to suppress formation of a high-resistance portion resulting from the reaction between the positive electrode active material and the solid electrolyte material.

The reason why the solid electrolyte material contains fluorine to thereby suppress production of a high-resistance portion at the interface between the positive electrode active material and the solid electrolyte material is not clear; however, the reason may be assumed as follows. That is, a metallic element in the positive electrode active material reacts with fluorine in the solid electrolyte material because of the potential of the positive electrode to produce a fluoride at the contact portion between the positive electrode active material and the solid electrolyte material. The fluoride conceivably functions as a reaction suppressing portion that suppresses reaction between the positive electrode active material and the solid electrolyte material. For example, when an $Li_2S$—$P_2S_5$-based solid electrolyte material is used as the solid electrolyte material, and $LiCoO_2$ is used as the positive electrode active material, the metallic element (Li) in the positive electrode active material reacts with the fluorine in the solid electrolyte material because of the potential of the positive electrode to thereby produce lithium fluoride (LiF) at the contact portion between the positive electrode active material and the solid electrolyte material. The LiF conceivably functions as a reaction suppressing portion that suppresses reaction between the positive electrode active material and the solid electrolyte material. This is presumably due to the relatively high electrochemical stability of LiF. In addition, the solid electrolyte material contains fluorine, so it is conceivable that the solid electrolyte material itself has a high electrochemical stability to thereby make it difficult to react with the positive electrode active material. When the solid electrolyte material is a sulfide-based solid electrolyte material, and the positive electrode active material is an oxide-based positive electrode active material, the metallic element in the oxide-based positive electrode active material tends to react with sulfur rather than oxygen. Therefore, the metallic element in the oxide-based positive electrode active material reacts with sulfur in the sulfide-based solid electrolyte material to form a metal sulfide. The metal sulfide itself becomes a resistance portion, and a deficiency (decomposition) of metal ions and sulfur ions occurs around the interface between the oxide-based positive electrode active material and the sulfide-based solid electrolyte material. In contrast, the solid electrolyte material contains fluorine, so it is presumable that the oxidation resistance of the solid electrolyte material improves to thereby suppress oxidative degradation.

Figure 2:
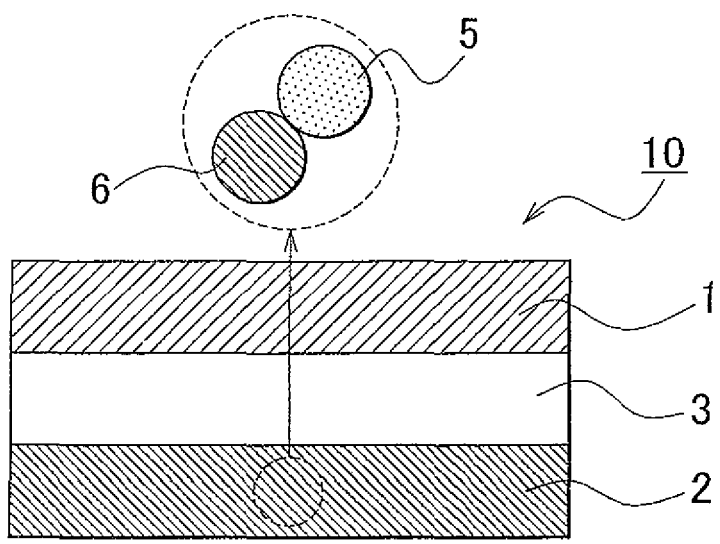
FIG. 2 is a schematic view that shows another example of the power generating element of the all-solid battery according to the embodiment of the invention.
Figure 3:
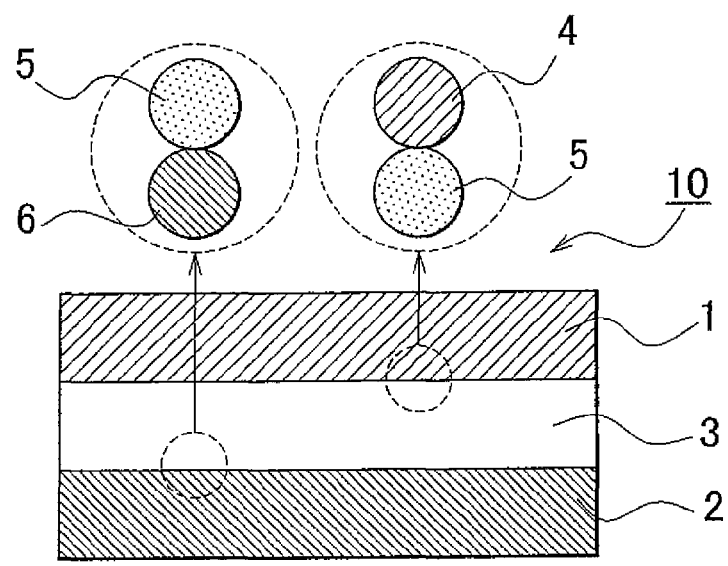
FIG. 3 is a schematic view that shows another example of the power generating element of the all-solid battery according to the embodiment of the invention.

Note that, in the above description, the positive electrode layer contains the solid electrolyte material; however, the aspect of the invention is not limited to the above embodiment. As illustrated in FIG. 2, when the negative electrode layer 2 contains a negative electrode active material 6 and the solid electrolyte material 5, because the solid electrolyte material contains fluorine, it is possible to suppress formation of a high-resistance portion at the interface between the negative electrode active material and the solid electrolyte material resulting from the reaction between the negative electrode active material and the solid electrolyte material. As well as the above described case, the metallic element in the negative electrode active material reacts with the fluorine in the solid electrolyte material because of the potential of the negative electrode to thereby produce a fluoride at the contact portion between the negative electrode active material and the solid electrolyte material. The fluoride conceivably functions as a reaction suppressing portion that suppresses reaction between the negative electrode active material and the solid electrolyte material. In addition, as illustrated in FIG. 3, when the solid electrolyte layer 3 contains the solid electrolyte material 5, a fluoride is produced at a portion at which at least one of the positive electrode active material and the negative electrode active material contacts the solid electrolyte material, that is, the interface between the solid electrolyte layer and at least one of the positive electrode layer and the negative electrode layer. The fluoride conceivably functions as a reaction suppressing portion that suppresses reaction between the positive electrode active material and the solid electrolyte material or between the negative electrode active material and the solid electrolyte material.

Thus, in the present embodiment, production of a high-resistance portion at the interface between the electrode active material and the solid electrolyte material. Hence, when the solid electrolyte material according to the present embodiment is used to form an all-solid battery, it is possible to reduce interface resistance to movement of ions across the interface between the electrode active material and the solid electrolyte material, so it is possible to suppress a decrease in output. Hereinafter, the components of the solid electrolyte material according to the present embodiment will be described.

The solid electrolyte material according to the present embodiment can react with an electrode active material to form a high-resistance portion. Note that production of a high-resistance portion may be confirmed by transmission electron microscope (TEM) or energy dispersive X-ray spectroscopy (EDX).

The solid electrolyte material is not specifically limited as long as the solid electrolyte material can react with an electrode active material to form a high-resistance portion. For example, the solid electrolyte material may be a sulfide-based solid electrolyte material, an oxide-based solid electrolyte material, a polymer solid electrolyte material, or the like. Among others, the solid electrolyte material is desirably the sulfide-based solid electrolyte material. This is because the sulfide-based solid electrolyte material has an excellent ion conductivity. In addition, the sulfide-based solid electrolyte material is softer than the positive electrode active material. When the sulfide-based solid electrolyte material is used to form a positive electrode layer by press forming, or the like, the sulfide-based solid electrolyte material is flattened in the positive electrode layer into a shape that covers the surface of the positive electrode active material. Therefore, the area of contact between the positive electrode active material and the solid electrolyte material increases, so the proportion of a high-resistance portion formed increases. In the present embodiment, the solid electrolyte material contains fluorine, so it is possible to suppress formation of a high-resistance portion at the interface between the positive electrode active material and the solid electrolyte material. Thus, when a large amount of high-resistance portion is formed as in the case where the sulfide-based solid electrolyte material is used, the advantageous effect may be remarkably exerted. A specific example of the sulfide-based solid electrolyte material may be $Li_7P_3S_{11}$, $80Li_2S-20P_2S_5$, $Li_3PO_4—Li_2S—SiS_2$, or the like.

In addition, the sulfide-based solid electrolyte material desirably contains Li, an element that belongs to group 13 to group 15, S and F. Furthermore, among the elements of group 13 to group 15, an element that belongs to group 14 or group 15 is desirable. The element that belongs to group 13 to group 15 is not-specifically limited. For example, the element may be P, Si, Ge, As, Sb, Al, or the like. Among others, the element is desirably P, Si, and Ge, and more desirably P.

In addition, the sulfide-based solid electrolyte material is desirably an amorphous mixture that contains a material composition, containing $Li_2S$ and a sulfide of an element that belongs to group 13 to group 15, and a fluoride. This is because the above method can produce a sulfide-based solid electrolyte material having a high lithium ion conductivity.

$Li_2S$ contained in the material composition desirably contains few impurities. This is because $Li_2S$ containing fewer impurities is able to suppress side reaction. A method of synthesizing $Li_2S$ may be, for example, the method described in Japanese Patent Application Publication No. 7-330312 (JP-A-7-330312). Furthermore, $Li_2S$ is desirably purified by, for example, the method described in International Patent Application Publication No. WO2005/040039, or the like. On the other hand, a sulfide of an element that belongs to group 13 to group 15, contained in the material composition, may be, for example, $P_2S_3$, $P_2S_5$, $SiS_2$, $GeS_2$, $As_2S_3$, $Sb_2S_3$, $Al_2S_3$, or the like.

In addition, the sulfide-based solid electrolyte material desirably does not substantially contain $Li_2S$. This is because the sulfide-based solid electrolyte material produces a less amount of hydrogen sulfide. $Li_2S$ reacts with water to produce hydrogen sulfide. For example, when the proportion of $Li_2S$ contained in the material composition is high, $Li_2S$ tends to remain. The fact that "the sulfide-based solid electrolyte material does not substantially contain $Li_2S$" may be confirmed through X-ray diffraction. Specifically, when there is no peak ($2\theta=27.0°$, $31.2°$, $44.8°$, $53.1°$) of $Li_2S$, it may be determined that the sulfide-based solid electrolyte material does not substantially contain $Li_2S$.

In addition, the sulfide-based solid electrolyte material desirably does not contain bridging sulfur. This is because the sulfide-based solid electrolyte material produces a less amount of hydrogen sulfide. The "bridging sulfur" is a bridging sulfur in a chemical compound that is formed by the reaction of $Li_2S$ and a sulfide of an element that belongs to group 13 to group 15. For example, a bridging sulfur in an $S_3P-S-PS_3$ unit formed by the reaction of $Li_2S$ and $P_2S_5$ corresponds to the "bridging sulfur". The above bridging sulfur tends to react with water and, therefore, tends to produce hydrogen sulfide. Furthermore, the fact that "the sulfide-based solid electrolyte material does not contain bridging sulfur" may be confirmed through Raman spectroscopy. For example, in the case of an $Li_2S-P_2S_5$-based solid electrolyte material, the peak of the $S_3P-S-PS_3$ unit normally appears at 402 $cm^{-1}$. Therefore, it is desirable that no peak is detected at 402 $cm^{-1}$. In addition, the peak of the $PS_4$ unit normally appears at 417 $cm^{-1}$. In the present embodiment, the intensity $I_{402}$ at 402 $cm^{-1}$ is desirably lower than the intensity $I_{417}$ at 417 $cm^{-1}$. More specifically, for example, with respect to the intensity $I_{417}$, the intensity $I_{402}$ is desirably lower than or equal to 70%, more desirably lower than or equal to 50%, and further desirably lower than or equal to 35%. In addition, in the case of a sulfide-based solid electrolyte material other than the $Li_2S-P_2S_5$-based solid electrolyte material as well, a unit that contains bridging sulfur is identified and then the peak of the unit is measured. By so doing, it is possible to determine that the sulfide-based solid electrolyte material does not substantially contain bridging sulfur.

In addition, when the sulfide-based solid electrolyte material does not substantially contain $Li_2S$ or bridging sulfur, the sulfide-based solid electrolyte material normally has an ortho composition or a composition close to the ortho composition. Here, the ortho generally indicates an oxoacid that has the highest degree of hydration among oxoacids obtained by hydrating the same oxide. In the present embodiment, a crystal composition of a sulfide having a largest amount of $Li_2S$ added is called ortho composition. For example, $Li_3PS_4$ corresponds to an ortho composition in an $Li_2S-P_2S_5$-based solid electrolyte material, $Li_3AlS_3$ corresponds to an ortho composition in an $Li_2S-Al_2S_3$-based solid electrolyte material, $Li_4SiS_4$ corresponds to an ortho composition in an $Li_2S-SiS_2$-based solid electrolyte material, and $Li_4GeS_4$ corresponds to an ortho composition in an $Li_2S-GeS_2$ solid electrolyte material. For example, in the case of an $Li_2S-P_2S_5$-based solid electrolyte material, the ratio of $Li_2S$ and $P_2S_5$ for obtaining an ortho composition is 75:25 on a molar basis. Similarly, in the case of an $Li_2S-Al_2S_3$-based solid electrolyte material, the ratio of $Li_2S$ and $Al_2S_3$ for obtaining an ortho composition is 75:25 on a molar basis. On the other hand, in the case of an $Li_2S-SiS_2$-based solid electrolyte material, the ratio of $Li_2S$ and $SiS_2$ for obtaining an ortho composition is 66.7:33.3 on a molar basis. Similarly, in the case of an $Li_2S-GeS_2$-based solid electrolyte material, the ratio of $Li_2S$ and $GeS_2$ for obtaining an ortho composition is 66.7:33.3 on a molar basis.

When the material composition contains $Li_2S$ and $P_2S_5$, the ratio of $Li_2S$ and $P_2S_5$ desirably ranges from 70:30 to 85:15, more desirably ranges from 70:30 to 80:20, and further desirably ranges from 72:28 to 78:22. Note that when the material composition contains $Li_2S$ and $Al_2S_3$, the ratio, and the like, of $Li_2S$ and $Al_2S_3$ is desirably equal to the above described ratio, and the like, of $Li_2S$ and $P_2S_5$.

On the other hand, when the material composition contains $Li_2S$ and $SiS_2$, the ratio of $Li_2S$ and $SiS_2$ desirably ranges from 50:50 to 80:20 on a molar basis, more desirably ranges from 55:45 to 75:25, and further desirably ranges from 60:40 to 70:30. Note that, when the material composition contains $Li_2S$ and $GeS_2$, the ratio, and the like, of $Li_2S$ and $GeS_2$ is desirably equal to the above described ratio, and the like, of $Li_2S$ and $SiS_2$.

In addition, the solid electrolyte material according to the present embodiment contains fluorine. Fluorine is desirably uniformly dispersed in the solid electrolyte material. When the solid electrolyte material is a sulfide-based solid electrolyte material, the sulfide-based solid electrolyte material is relatively soft and is flattened when subjected to press forming, or the like, as described above. Therefore, because of uniformly dispersed fluorine, fluorine may be present at the contact portion between the positive electrode active material and the solid electrolyte material in the positive electrode layer even after press forming, so it is possible to suppress production of a high-resistance portion.

Fluorine is desirably contained in a form such that part of the solid electrolyte material is fluorinated. That is, the solid electrolyte material is desirably not a mere mixture of the solid electrolyte material and a fluoride. For example, when the solid electrolyte material is an $Li_2S-P_2S_5$-based solid electrolyte material, the solid electrolyte material is desirably not a mere mixture of the $Li_2S-P_2S_5$-based solid electrolyte material and a fluoride. Specifically, part of a skeletal element of the solid electrolyte material is desirably fluorinated. For example, when the solid electrolyte material is an $Li_2S-P_2S_5$-based solid electrolyte material, part of phosphorus (P), which is a skeletal element of the solid electrolyte material, is fluorinated. Note that the fact that the solid electrolyte material is fluorinated may be confirmed through X-ray diffraction analysis (XRD), nuclear magnetic resonance spectroscopy (NMR) or Raman spectroscopy. For example, in a fluorine solid-state NMR (F-NMR), no peak that belongs to a fluoride used in synthesizing the solid electrolyte material is detected but a new peak is detected, so it is possible to confirm that the solid electrolyte material is fluorinated. Specifically, it is desirable that the solid electrolyte material has a peak around 190 ppm in F-NMR. The peak is a new peak that should not be observed from the fluoride used in synthesizing the solid electrolyte material. Thus, it may be determined that fluorine (F) has a chemical state different from the chemical state of the fluoride used in synthesizing the solid electrolyte material, and has a chemical bond different from that of the fluoride. In addition, for example, when the solid electrolyte material contains phosphorus (P) as a skeletal element, no peak that belongs to the skeletal structure of the solid electrolyte material is detected in phosphorus solid-state NMR (P-NMR), and, in addition, when a fluoride that contains phosphorus (P) is used in synthesizing the solid electrolyte material, no peak that belongs to the fluoride is detected but a new peak is detected. Thus, it is possible to confirm that the solid electrolyte material is fluorinated. Specifically, it is desirable that the solid electrolyte material has a peak around 40 ppm in P-NMR. The peak is a new peak that should not be observed from the skeletal structure of the solid electrolyte material and that should not be observed even when a fluoride that contains phosphorus (P) is used in synthesizing the solid electrolyte material. Thus, it may be determined that phosphorus (P) has a chemical state different from the chemical state of the skeletal structure of the solid electrolyte material and has a chemical bond different from that of the skeletal structure.

Here, the "skeletal element" of the solid electrolyte material means an element, other than fluorine and an element that becomes a conducting ion, among the constituent elements of the solid electrolyte material. For example, when the solid electrolyte material is an $Li_2S$—$P_2S_5$-based solid electrolyte material, the constituent elements are lithium (Li), phosphorus (P) and sulfur (S), an element that becomes a conducting ion is lithium (Li), so the skeletal elements are phosphorus (P) and sulfur (S).

The content of fluorine desirably ranges from 0.1 mole percent to 20 mole percent with respect to the solid electrolyte material, more desirably ranges from 0.2 mole percent to 15 mole percent, and further desirably ranges from 0.5 mole percent to 10 mole percent. This is because of the following reasons. If the content of fluorine is excessively high, the ion conductance of the solid electrolyte material decreases. In addition, even when the content of fluorine is increased, the effect of reducing interface resistance does not further improve. On the other hand, if the content of fluorine is excessively low, the effect of reducing interface resistance cannot be sufficiently obtained.

The solid electrolyte material may be crystalline or may be amorphous. Among others, the solid electrolyte material is desirably amorphous. When the solid electrolyte material is amorphous, fluorine is uniformly dispersed therein, so it is possible to sufficiently exert the advantageous effect of the aspect of the invention. In addition, as described above, when the solid electrolyte material is amorphous, no peak that belongs to the fluoride used in synthesizing the solid electrolyte material is detected. Note that the fact that the solid electrolyte material is amorphous may be confirmed through X-ray diffraction analysis (XRD).

The solid electrolyte material according to the present embodiment is normally powdery, and the mean diameter, for example, ranges from 0.1 µm to 50 µm.

The solid electrolyte material according to the present embodiment may be, for example, used for an all-solid battery. The type of all-solid battery may be an all-solid lithium battery, an all-solid sodium battery, an all-solid magnesium battery, an all-solid calcium battery, or the like. Among others, the type of all-solid battery is desirably an all-solid lithium battery or an all-solid sodium battery, and is further desirably an all-solid lithium battery. In an all-solid battery, at least one of a positive electrode layer, a negative electrode layer and a solid electrolyte layer contains the solid electrolyte material. Among others, at least one of the positive electrode layer and the negative electrode layer contains the solid electrolyte material, and, further desirably, the positive electrode layer contains the solid electrolyte material.

Note that the manufacturing method for a solid electrolyte material will be described in detail in "D. Manufacturing Method for Solid Electrolyte Material" later.

B. Electrode Element

The electrode element according to the present embodiment contains an electrode active material and the above described solid electrolyte material.

With the present embodiment, because the electrode element contains the above described solid electrolyte material, the electrode element is able to suppress production of a high-resistance portion at the interface between the electrode active material and the solid electrolyte material to thereby reduce interface resistance. Hereinafter, the components of the electrode element according to the present embodiment will be described.

1. Solid Electrolyte Material

The content of the solid electrolyte material in the electrode element according to the present embodiment is appropriately selected in accordance with an application of the electrode element. For example, when the electrode element is used as the positive electrode layer, the content of the solid electrolyte material in the positive electrode layer desirably ranges from 1 percent by weight to 90 percent by weight, and more desirably ranges from 10 percent by weight to 80 percent by weight. On the other hand, for example, when the electrode element is used as the negative electrode layer, the content of the solid electrolyte material in the negative electrode layer desirably ranges from 10 percent by weight to 90 percent by weight, and more desirably ranges from 20 percent by weight to 80 percent by weight. Note that the details of the solid electrolyte material are described in the above "A. Solid Electrolyte Material", so the description thereof is omitted here.

2. Electrode Active Material

The electrode active material used in the present embodiment may be a positive electrode active material or a negative electrode active material; however, among others, the electrode active material is desirably a positive electrode active material. Generally, the positive electrode layer has a relatively high resistance, and the negative electrode layer has a relatively low resistance. For this reason, the electrode element according to the present embodiment is desirably used as the positive electrode layer that contains the positive electrode active material. Hereinafter, the positive electrode active material and the negative electrode active material will be separately described.

(1) Positive Electrode Active Material

The positive electrode active material used in the present embodiment varies with the type of conducting ion of an intended all-solid battery. For example, when the all-solid battery according to the present embodiment is an all-solid lithium secondary battery, the positive electrode active material occludes or releases lithium ions. In addition, the positive electrode active material used in the present embodiment normally can react with the above described solid electrolyte material to form a high-resistance portion.

The positive electrode active material is not specifically limited as long as the positive electrode active material can react with the solid electrolyte material to form a high-resistance portion; however, among others, the positive electrode active material is desirably an oxide-based positive electrode active material. As described above, when the solid electrolyte material is a sulfide-based solid electrolyte material, the metallic element in the oxide-based positive electrode active material tends to react with sulfur rather than oxygen. Therefore, the metallic element in the oxide-based positive electrode active material reacts with sulfur in the sulfide-based solid electrolyte material to form a metal sulfide. The metal sulfide itself becomes a resistance portion, and a deficiency (decomposition) of metal ions and sulfur ions occurs around the interface between the oxide-based positive electrode active material and the sulfide-based solid electrolyte material. In the present embodiment, the solid electrolyte material contains fluorine, so it is possible to suppress formation of a high-resistance portion at the interface between the positive electrode active material and the solid electrolyte material.

Thus, when the oxide-based positive electrode active material is used, the advantageous effect may be remarkably exerted. In addition, the oxide-based positive electrode active material is used to make it possible to obtain an all-solid battery having a high energy density.

The oxide-based positive electrode active material used for an all-solid lithium battery may be, for example, a positive electrode active material expressed by general formula $Li_xM_yO_z$ (where M is a transition metallic element, x=0.02 to 2.2, y=1 to 2 and z=1.4 to 4). In the above general formula, M is desirably at least one selected from the group consisting of Co, Mn, Ni, V, Fe and Si, and is, more desirably, at least one selected from the group consisting of Co, Ni and Mn. The above oxide-based positive electrode active material may be, specifically, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$, $Li_2MnSiO_4$, or the like. In addition, the positive electrode active material other than the above general formula $Li_xM_yO_z$ may be an olivine positive electrode active material, such as $LiFePO_4$ and $LiMnPO_4$.

Figure 4A:
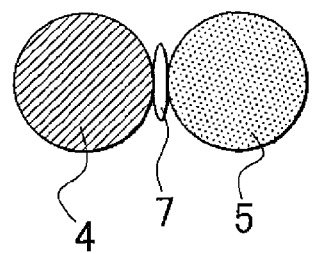
FIG. 4A and FIG. 4B are schematic views that illustrate the state of an interface between a positive electrode active material and a solid electrolyte material according to the embodiment of the invention.

In addition, the surface of the positive electrode active material is desirably coated with an oxide. This is because it is possible to further suppress production of a high-resistance portion resulting from the reaction between the positive electrode active material and the solid electrolyte material. Note that, in the present embodiment, even when the positive electrode active material is not coated with an oxide, production of a high-resistance portion may be suppressed. Specifically, as shown in FIG. 4A, the solid electrolyte material 5 in the present embodiment contains fluorine, so it is conceivable that a fluoride 7 is formed at the interface between the solid electrolyte material 5 and the positive electrode active material 4. This is conceivably because fluorine generally has a high diffusion rate and, therefore, fluorine, contained in the solid electrolyte material 5, reacts with a metal (for example, Li) in the positive electrode active material to thereby produce the fluoride 7 (for example, LiF) before interdiffusion occurs between the solid electrolyte material 5 and the positive electrode active material 4 to produce a high-resistance portion. In addition, the fluoride 7 conceivably functions as a reaction suppressing portion.

Figure 4B:
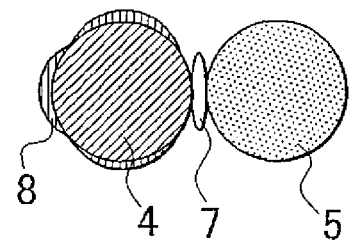

In this way, in the present embodiment, even when the positive electrode active material is not coated with an oxide, it is possible to suppress production of a high-resistance portion. However, for example, when the positive electrode active material expands or contracts through insertion or desorption of metal ions, there is a possibility that the positive electrode active material contacts the solid electrolyte material at a portion at which no fluoride is formed and then a new high-resistance portion is produced. In this case, when the surface of the positive electrode active material is coated with an oxide, it is possible to suppress production of a new high-resistance portion. Specifically, as shown in FIG. 4B, the positive electrode active material 4 is coated with an oxide 8 to thereby make it possible to suppress production of a new high-resistance portion. On the other hand, from another viewpoint, even when the positive electrode active material 4 is coated with the oxide 8 by the existing method, it is normally difficult to completely coat the positive electrode active material 4, and the positive electrode active material 4 has an uncoated exposed portion. In this case as well, because the solid electrolyte material 5 according to the present embodiment contains fluorine, even when the solid electrolyte material 5 contacts the exposed portion of the positive electrode active material 4, the fluoride 7 is formed to make it possible to suppress production of a high-resistance portion. In addition, for example, even when part of the oxide 8 that coats the positive electrode active material 4 peels off by physical or chemical action, it is possible to similarly suppress production of a high-resistance portion. In addition, for example, the positive electrode active material 4 having a high coverage of the oxide 8 is used to thereby make it possible to minimize the amount of the fluoride 7 produced at the interface between the positive electrode active material 4 and the solid electrolyte material 5.

In addition, in the present embodiment, the oxide is desirably an ion-conducting oxide. This is because ions are conducted through the inside of the ion-conducting oxide to make it possible to decrease resistance on the surface of the positive electrode active material. By so doing, the electrode element having a low interface resistance may be obtained. When the electrode element according to the present embodiment is used for an all-solid lithium battery, the ion-conducting oxide desirably includes a lithium element, an M element (M is a metallic element) and an oxygen element. The M is not specifically limited; however, the M may be, for example, Nb, Ti, Zr, or the like. Furthermore, a specific example of the ion-conducting oxide may be, for example, $LiNbO_3$, $Li_4Ti_5O_{12}$, $LiTiO_3$, $Li_2ZrO_3$, or the like. On the other hand, the oxide may have no ion conductivity. When the above oxide is used, it is difficult to improve the initial characteristic of interface resistance, but it is possible to suppress production of a high-resistance portion. The oxide having no ion conductivity may be, for example, $TiO_2$, $ZrO_2$, or the like.

For example, the thickness of the oxide that coats the positive electrode active material desirably ranges from 1 nm to 500 nm and more desirably ranges from 2 nm to 100 nm. This is because, as long as the thickness falls within the above range, it is possible to sufficiently suppress reaction between the positive electrode active material and the solid electrolyte material. The oxide desirably coats a wide area of the surface of the positive electrode active material. Specifically, the coverage of the oxide is desirably higher than or equal to 40%, more desirably higher than or equal to 70%, and further desirably higher than or equal to 90%. A method of coating the positive electrode active material with the oxide may be, for example, rolling fluidized coating (sol-gel process), mechanofusion, CVD, PVD, or the like.

The shape of the positive electrode active material may be, for example, a particulate shape. Among others, the shape of the positive electrode active material is desirably a spherical shape or an ellipsoidal shape. In addition, when the positive electrode active material has a particulate shape, the mean particle diameter desirably ranges, for example, from 0.1 μm to 50 μm.

When the electrode element is used as the positive electrode layer, the content of the positive electrode active material in the positive electrode layer desirably ranges, for example, from 10 percent by weight to 99 percent by weight, and more desirably ranges from 20 percent by weight to 90 percent by weight.

(2) Negative Electrode Active Material

The negative electrode active material used in the present embodiment varies with the type of conducting ion of an intended all-solid battery. For example, when the all-solid battery according to the present embodiment is an all-solid lithium secondary battery, the negative electrode active material occludes or releases lithium ions. In addition, the negative electrode active material used in the present embodiment normally can react with the above described solid electrolyte material to form a high-resistance portion.

The negative electrode active material is not specifically limited as long as the negative electrode active material can react with the solid electrolyte material to form a high-resistance portion; however, among others, the negative electrode active material may be, for example, a metal active material or a carbon active material. The metal active material may be, for example, In, Al, Si, Sn, or the like. On the other hand, the carbon active material may be, for example, mesocarbon microbead (MCMB), highly oriented graphite (HOPG), hard carbon, soft carbon, or the like. In addition, the surface of the negative electrode active material is desirably coated with the above described oxide as in the case of the surface of the positive electrode active material.

When the electrode element is used as the negative electrode layer, the content of the negative electrode active material in the negative electrode layer, for example, desirably ranges from 10 percent by weight to 90 percent by weight and more desirably ranges from 20 percent by weight to 80 percent by weight.

3. Additive

The electrode element according to the present embodiment may further contain a conducting material. By adding the conducting material, it is possible to improve conductivity. The conducting material is, for example, acetylene black, Ketjen black, carbon fiber, or the like. In addition, the electrode element may contain a binding agent. The type of binding agent may be, for example, a binding agent containing fluorine, or the like.

4. Electrode Element

The thickness of the electrode element according to the present embodiment varies with the type of an intended all-solid battery and an application of the electrode element. For example, when the electrode element is used as the positive electrode layer, the thickness of the positive electrode layer desirably ranges from 1 μm to 100 μm. On the other hand, for example, when the electrode element is used as the negative electrode layer, the thickness of the negative electrode layer desirably ranges from 1 μm to 200 μm.

A method of forming the electrode element may be, for example, a method in which the electrode active material is mixed with the solid electrolyte material and then the mixture is subjected to compression molding.

The electrode element according to the present embodiment may be, for example, used for an all-solid battery. Note that the type of all-solid battery is described in the above "A. Solid Electrolyte Material", so the description thereof is omitted here. In the all-solid battery, the electrode element is used as at least one of the positive electrode layer and the negative electrode layer. Among others, the electrode element is desirably used as the positive electrode layer.

C. All-Solid Battery

The all-solid battery according to the present embodiment includes a positive electrode layer, a negative electrode layer and a solid electrolyte layer that is formed between the positive electrode layer and the negative electrode layer, and at least one of the positive electrode layer, the negative electrode layer and the solid electrolyte layer contains the above described solid electrolyte material.

FIG. 1 to FIG. 3 respectively illustrate examples of the power generating element of the all-solid battery according to the embodiment of the invention. The power generating element 10 of the all-solid battery shown in each of FIG. 1 to FIG. 3 includes the positive electrode layer 1, the negative electrode layer 2 and the solid electrolyte layer 3 that is formed between the positive electrode layer 1 and the negative electrode layer 2. In FIG. 1, the positive electrode layer 1 (positive electrode mixture layer) contains the positive electrode active material 4 and the solid electrolyte material 5, and these are uniformly mixed. In FIG. 2, the negative electrode layer 2 contains the negative electrode active material 6 and the solid electrolyte material 5, and these are uniformly mixed. In FIG. 3, the solid electrolyte layer 3 contains the solid electrolyte material 5. Although not shown in FIG. 1 to FIG. 3, the solid electrolyte material 5 contains fluorine, and fluorine is uniformly dispersed in the solid electrolyte material 5.

With the present embodiment, at least one of the positive electrode layer, the negative electrode layer and the solid electrolyte layer contains the above described solid electrolyte material. Thus, it is possible to suppress production of a high-resistance portion resulting from the reaction between the solid electrolyte material and the electrode active material that is contained in the positive electrode layer or the negative electrode layer. By so doing, it is possible to suppress an increase over time in interface resistance between the electrode active material and the solid electrolyte material. As a result, it is possible to provide an all-solid battery having a high durability. The all-solid battery according to the present embodiment has such a feature that formation of a high-resistance portion is suppressed even at high temperatures and a decrease in output characteristic is small. Because an in-vehicle all-solid battery is exposed to a high-temperature environment, the all-solid battery according to the present embodiment is useful.

In the present embodiment, among others, the positive electrode layer desirably contains the above described solid electrolyte material. That is, the positive electrode layer is desirably the above described electrode element. As described above, generally, the positive electrode layer has a resistance higher than that of the negative electrode layer, so the above described electrode element is desirably used as the positive electrode layer.

Note that the details of the solid electrolyte material are described in the above "A. Solid Electrolyte Material", so the description thereof is omitted here. Hereinafter, the other components of the all-solid battery according to the present embodiment will be described.

1. Positive Electrode Layer

The positive electrode layer in the present embodiment contains at least the positive electrode active material and may contain the solid electrolyte material where appropriate. When the positive electrode layer contains the solid electrolyte material, the solid electrolyte material contained in the positive electrode layer is desirably the above described solid electrolyte material that contains fluorine. This is because the interface resistance between the positive electrode active material and the solid electrolyte material may be reduced.

Note that the other configuration of the positive electrode layer is the same as that when the electrode element is used as the positive electrode layer as described in the above "B. Electrode Element", so the description thereof is omitted here.

2. Negative Electrode Layer

The negative electrode layer contains at least the negative electrode active material, and may contain the solid electrolyte material where appropriate. When the negative electrode layer contains the solid electrolyte material, the solid electrolyte material contained in the negative electrode layer is desirably the above described solid electrolyte material. This is because the interface resistance between the negative electrode active material and the solid electrolyte material may be reduced.

Note that the other configuration of the negative electrode layer is the same as that when the electrode element is used as the negative electrode layer as described in the above "B. Electrode Element", so the description thereof is omitted here.

3. Solid Electrolyte Layer

The solid electrolyte layer according to the present embodiment is formed between the positive electrode layer and the negative electrode layer, and contains at least the solid electrolyte material. As described above, when the positive electrode layer contains the above described solid electrolyte material that contains fluorine, the solid electrolyte material contained in the solid electrolyte layer may be the above described solid electrolyte material that contains fluorine or may be another solid electrolyte material. On the other hand, when the positive electrode layer does not contain the above described solid electrolyte material that contains fluorine, the solid electrolyte layer normally contains the above described solid electrolyte material that contains fluorine. When the solid electrolyte layer contains the above described solid electrolyte material that contains fluorine, the solid electrolyte material contained in the solid electrolyte layer is desirably only the above described solid electrolyte material that contains fluorine.

When the solid electrolyte material contained in the solid electrolyte layer is a solid electrolyte material other than the above described solid electrolyte material that contains fluorine, the solid electrolyte material may be, for example, $Li_7P_3S_{11}$, $80Li_2S-20P_2S_5$, $Li_3PO_4—Li_2S—SiS_2$, $Li_{3.25}Ge_{0.25}P_{0.75}O_4$, or the like.

For example, the thickness of the solid electrolyte layer desirably ranges from 0.1 μm to 1000 μm and more desirably ranges from 0.1 μm to 300 μm.

4. Other Components

The all-solid battery according to the present embodiment includes at least the above described positive electrode layer, solid electrolyte layer and negative electrode layer. The all-solid battery normally further includes a positive electrode current collector that collects electric current in the positive electrode layer and a negative electrode current collector that collects electric current in the negative electrode layer. The material of the positive electrode current collector may be, for example, SUS, aluminum, nickel, iron, titanium, carbon, or the like. Among others, the material of the positive electrode current collector is desirably SUS. On the other hand, the material of the negative electrode current collector may be, for example, SUS, copper, nickel, carbon, or the like. Among others, the material of the negative electrode current collector is desirably SUS. In addition, the thickness, shape, and the like, of each of the positive electrode current collector and the negative electrode current collector are desirably selected appropriately on the basis of an application, or the like, of the all-solid battery. In addition, a battery case used in the present embodiment may be a typical battery case for an all-solid battery. The battery case may be, for example, a SUS battery case, or the like. In addition, the all-solid battery according to the present embodiment may be configured so that the power generating element is formed inside an insulating ring.

5. All-Solid Battery

In the present embodiment, the type of conducting ion is not specifically limited. The type of all-solid battery according to the present embodiment may be an all-solid lithium battery, an all-solid sodium battery, an all-solid magnesium battery, an all-solid calcium battery, or the like. Among others, the type of all-solid battery is more desirably an all-solid lithium battery or an all-solid sodium battery, and is further desirably an all-solid lithium battery. In addition, the all-solid battery according to the present embodiment may be a primary battery or may be a secondary battery. Among others, the all-solid battery is desirably a secondary battery. This is because the secondary battery may be repeatedly charged or discharged, and is useful in, for example, an in-vehicle battery. The shape of the all-solid battery may be, for example, a coin shape, a laminated shape, a cylindrical shape, a square shape, or the like. Among others, the shape of the all-solid battery is desirably a square shape or a laminated shape, and is further desirably a laminated shape.

In addition, a manufacturing method for the all-solid battery according to the present embodiment is not specifically limited as long as the above described all-solid battery may be obtained. The manufacturing method may be a method similar to a typical manufacturing method for an all-solid battery. An example of the manufacturing method for an all-solid battery may be, for example, a method in which the power generating element is prepared by sequentially pressing a material that constitutes the positive electrode layer, a material that constitutes the solid electrolyte layer and a material that constitutes the negative electrode layer, the power generating element is accommodated inside a battery case and then the battery case is crimped.

D. Manufacturing Method for Solid Electrolyte Material

The manufacturing method for the solid electrolyte material according to the present embodiment includes adding a fluoride to a material composition that contains a constituent element of the solid electrolyte material and then amorphizing the material composition to which the fluoride has been added.

According to the present embodiment, by amorphizing the material composition and the fluoride, it is possible to obtain a solid electrolyte material that contains fluorine, desirably, a solid electrolyte material that is partially fluorinated. In the present embodiment, it is possible to synthesize a solid electrolyte material that contains fluorine, which is able to suppress production of a high-resistance portion at the interface between the solid electrolyte material and an electrode active material, with a simple process at low cost.

Figure 5:
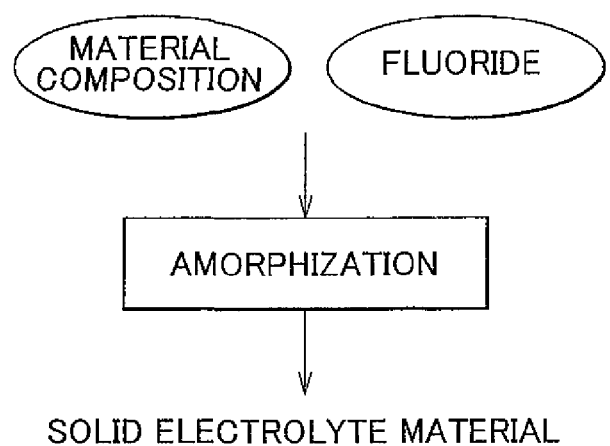
FIG. 5 is a flowchart that shows an example of a manufacturing method for a solid electrolyte material according to the embodiment of the invention.

FIG. 5 is a flowchart that shows an example of a manufacturing method for a solid electrolyte material according to the embodiment of the invention. In the manufacturing method shown in FIG. 5, first, a fluoride is added to a material composition at a predetermined proportion, and is then subjected to amorphization.

Hereinafter, the material composition, the fluoride and steps in the manufacturing method for a solid electrolyte material according to the present embodiment will be described.

1. Material Composition

The material composition used in the present embodiment contains a constituent element of the solid electrolyte material.

A chemical compound that contains a constituent element of a solid electrolyte material is appropriately selected in accordance with the intended solid electrolyte material. For example, when an $Li_2S—P_2S_5$-based solid electrolyte material is synthesized, a composition that contains lithium sulfide ($Li_2S$) and phosphorus sulfide ($P_2S_5$) is used as the material composition.

The mole fraction of a chemical compound that contains a constituent element of a solid electrolyte material is appropriately selected in accordance with the intended solid electrolyte material. The chemical compound is mixed at a predetermined proportion desirably in an atmosphere of inert gas (for example, in an atmosphere of Ar gas).

2. Fluoride

The fluoride used in the present embodiment desirably contains a constituent element of the solid electrolyte material. In this case, the fluoride may contain fluorine and a constituent element of the solid electrolyte material only, or may contain fluorine, a constituent element of the solid electrolyte material and another element. Among others, the fluoride desirably contains fluorine and a constituent element of the solid electrolyte material only. The fluoride that contains a constituent element of the solid electrolyte material is appropriately selected in accordance with the type of solid electrolyte material. For example, when a solid electrolyte material used for an all-solid lithium battery is synthesized, the fluoride that contains a constituent element of the solid electrolyte material may be lithium fluoride (LiF), lithium hexafluorophosphate ($LiPF_6$), or the like.

Particularly, the fluoride desirably contains a skeletal element of the solid electrolyte material. This is because the fluoride that contains the skeletal element is used to make it possible to reduce initial interface resistance. This is conceivably because the fluoride contains the skeletal element and, therefore, fluorine is easily incorporated into the skeletal structure of the solid electrolyte material. That is, this is conceivably because the solid electrolyte material is easily fluorinated. Note that the "skeletal element" means an element, other than fluorine and an element that becomes a conducting ion, among the constituent elements of the solid electrolyte material. For example, when an $Li_2S$—$P_2S_5$-based solid electrolyte material is synthesized, the constituent elements are lithium (Li), phosphorus (P) and sulfur (S), an element that becomes a conducting ion is lithium (Li), and the skeletal elements are phosphorus (P) and sulfur (S). Among the above described examples, lithium hexafluorophosphate ($LiPF_6$) is desirably used as the fluoride that contains a skeletal element of the solid electrolyte material.

The amount of fluoride added desirably ranges from 0.1 mole percent to 20 mole percent on a fluorine basis with respect to the solid electrolyte material, more desirably ranges from 0.2 mole percent to 15 mole percent, and further desirably ranges from 0.5 mole percent to 10 mole percent. This is because of the following reasons. If the amount of fluoride added is excessively high, the ion conductance of the solid electrolyte material decreases. In addition, even when the amount of fluoride added is increased, the effect of reducing interface resistance does not further improve. On the other hand, if the amount of fluoride added is excessively low, the effect of reducing interface resistance cannot be sufficiently obtained. The fluoride is added at a predetermined proportion desirably in an atmosphere of inert gas (for example, in an atmosphere of Ar gas).

3. Amorphization

In the present embodiment, the above described material composition and fluoride are amorphized through amorphization to thereby obtain the solid electrolyte material. Amorphization may be, for example, mechanical milling or melt extraction, and, among others, is desirably mechanical milling. This is because treatment may be performed at room temperature to thereby make it possible to simplify the manufacturing process.

Mechanical milling is not specifically limited as long as the material composition is mixed with the fluoride while imparting mechanical energy. The mechanical milling may be, for example, ball mill, turbo mill, mechanofusion, disk mill, or the like, and, among others, is desirably ball mill, and is further desirably planetary ball mill. This is because a desired solid electrolyte material may be efficiently obtained.

In addition, conditions of mechanical milling are desirably set so that a sufficiently amorphized solid electrolyte material may be obtained. For example, when a solid electrolyte material is synthesized by planetary ball mill, a material composition, a fluoride and milling balls are placed in a pot and then subjected to treatment at a predetermined rotational speed for a predetermined period of time. Generally, as the rotational speed increases, the rate of production of the solid electrolyte material increases, and, as the treatment time elongates, the degree of conversion from the material composition to the solid electrolyte material increases. The rotational speed at which planetary ball mill is performed desirably ranges, for example, from 200 rpm to 500 rpm, and more desirably ranges from 250 rpm to 400 rpm. In addition, the treatment time during which planetary ball mill is performed desirably ranges, for example, from an hour to 100 hours and more desirably ranges from an hour to 50 hours. In addition, this process is desirably performed in an atmosphere of inert gas (for example, in an atmosphere of Ar gas).

Note that the embodiment of the invention is not limited to the above described embodiment. The above described embodiment is only illustrative. The scope of the invention encompasses any embodiment that includes substantially equivalent components and has substantially similar advantageous effects to those of the technical ideas recited in the appended claims.

Hereinafter, the aspect of the invention will be more specifically described with reference to examples.

First Example

Synthesis of Solid Electrolyte Material

Lithium sulfide ($Li_2S$) and phosphorus sulfide ($P_2S_5$) were used as the material composition, and lithium fluoride (LiF) was used as the fluoride. The powder of them was placed in a glove box in an atmosphere of argon, and 0.3828 g $Li_2S$, 0.6172 g $P_2S_5$ and 0.01 g LiF were weighed and then these were mixed in an agate mortar. At this time, the ratio of $Li_2S$ and $P_2S_5$ was 75:25 on a molar basis. In addition, the amount of LiF added was 6.5 mole percent on a fluorine basis with respect to the solid electrolyte material to be obtained. Subsequently, the mixed composition was put into a 45 ml zirconia pot, zirconia balls were further put into the pot and then the pot was completely hermetically sealed. The pot was mounted on a planetary ball milling machine. Then, mechanical milling was performed at a rotational speed of 370 rpm for 40 hours. After that, the solid electrolyte material ($Li_2S$—$P_2S_5$-based solid electrolyte material that contains fluorine) was obtained.

Manufacturing of All-Solid Battery

First, $LiCoO_2$ was used as the positive electrode active material, and the positive electrode active material and the above described solid electrolyte material were mixed at a ratio by weight of 7:3 to thereby obtain a positive electrode mixture. Then, the power generating element 10, like the one shown in FIG. 1, was formed by a pressing machine. The above described positive electrode mixture was used for the positive electrode layer 1, the solid electrolyte material ($Li_7P_3S_{11}$) prepared in accordance with the method described in JP-A-2005-228570 was used for the solid electrolyte layer 3, and indium foil was used for the negative electrode layer 2. The above power generating element was used to obtain an all-solid battery.

Second Example

Under the same condition as that of the first example except that the amount of LiF added was changed to 0.05 g, a solid electrolyte material was synthesized, and then an all-solid battery was manufactured. At this time, the amount of LiF added was 33 mole percent on a fluorine basis with respect to the solid electrolyte material to be obtained.

Third Example

Under the same condition as that of the first example except that lithium hexafluorophosphate ($LiPF_6$) was used instead of lithium fluoride (LiF), a solid electrolyte material was synthesized, and then an all-solid battery was manufactured. At this time, the amount of $LiPF_6$ added was 6.6 mole percent on a fluorine basis with respect to the solid electrolyte material to be obtained.

Fourth Example

Under the same condition as that of the second example except that lithium hexafluorophosphate ($LiPF_6$) was used instead of lithium fluoride (LiF), a solid electrolyte material was synthesized, and then an all-solid battery was manufactured. At this time, the amount of $LiPF_6$ added was 33 mole percent on a fluorine basis with respect to the solid electrolyte material to be obtained.

First Comparative Example

Figure 6:
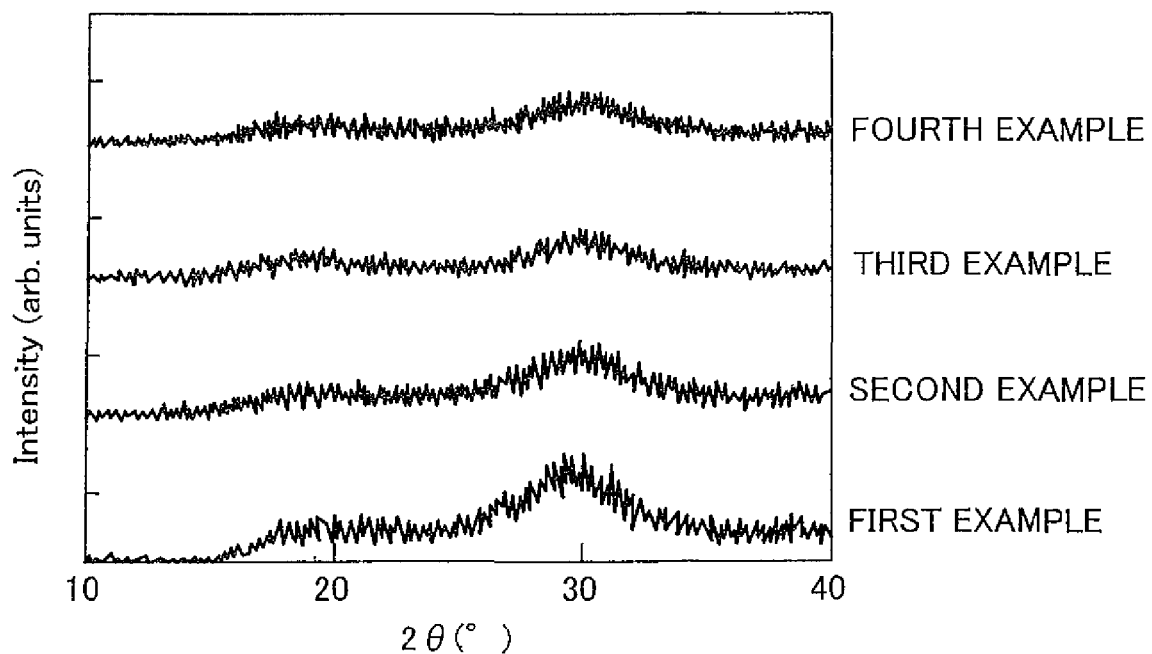
FIG. 6 are the X-ray diffraction patterns of solid electrolyte materials according to first to fourth examples.
Figure 7A:
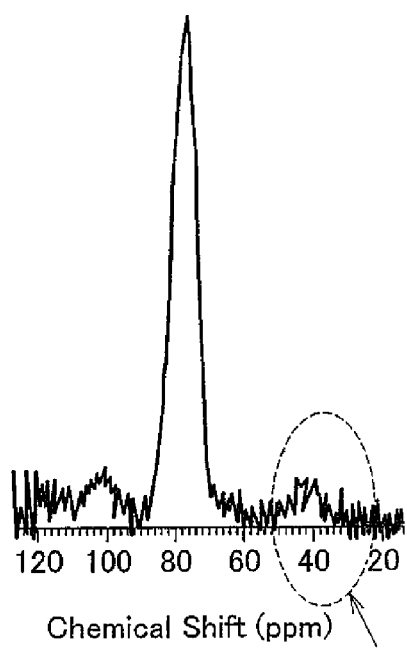
FIG. 7A to FIG. 7D are the P-NMR spectra of the solid electrolyte materials according to the first to fourth examples.
Figure 7B:
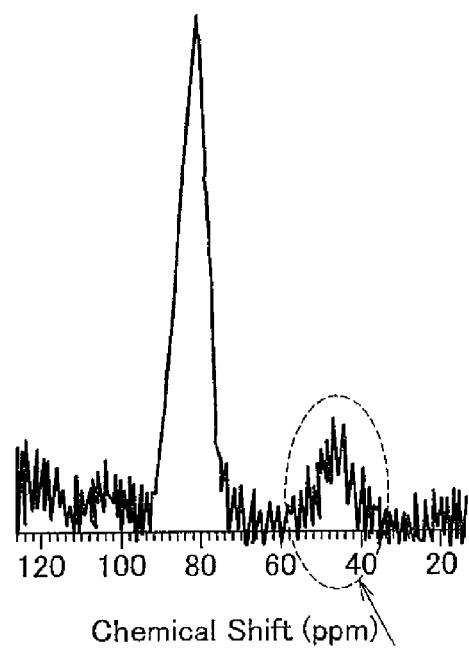
Figure 7C:
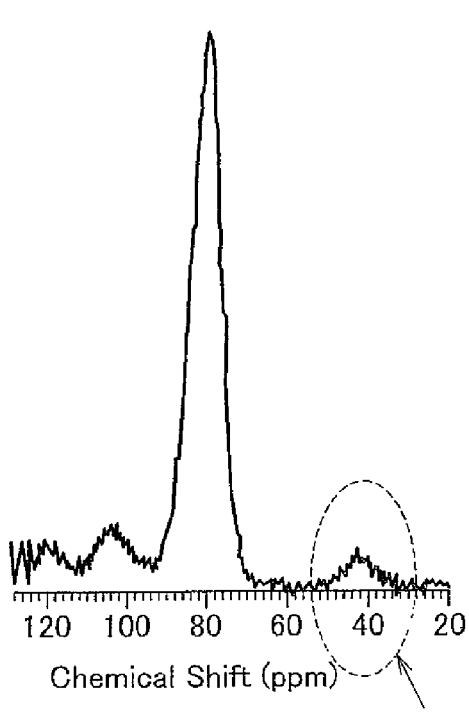
Figure 7D:
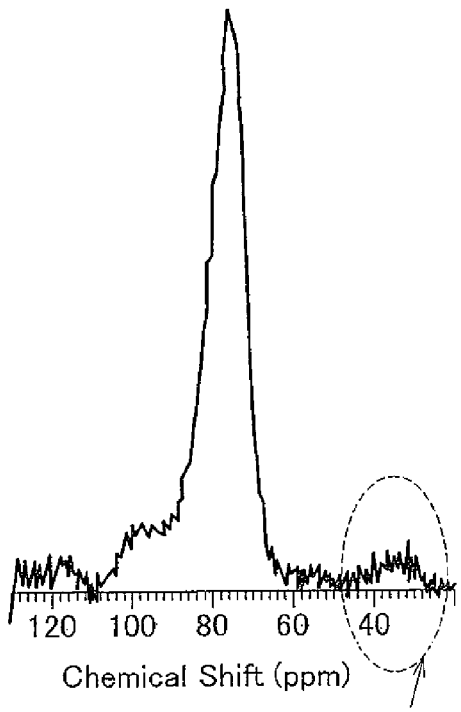
Figure 8A:
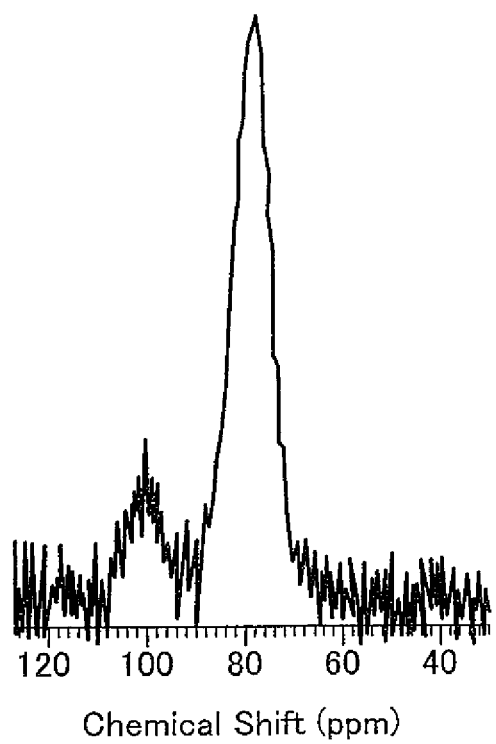
FIG. 8A and FIG. 8B are the P-NMR spectrum of a solid electrolyte material according to a first comparative example and the P-NMR spectrum of $LiPF_6$.
Figure 8B:
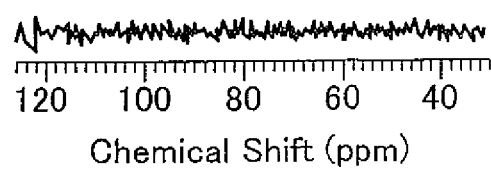
Figure 9A:
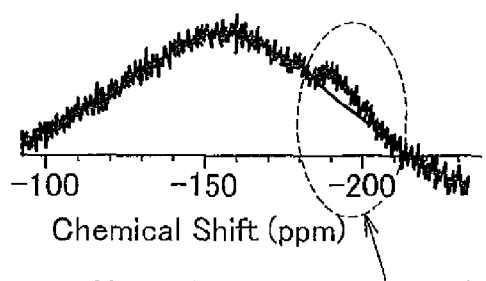
FIG. 9A to FIG. 9F are the F-NMR spectra of the solid electrolyte materials according to the first to fourth examples, the F-NMR spectrum of LiF and the F-NMR spectrum of $LiPF_6$.
Figure 9B:
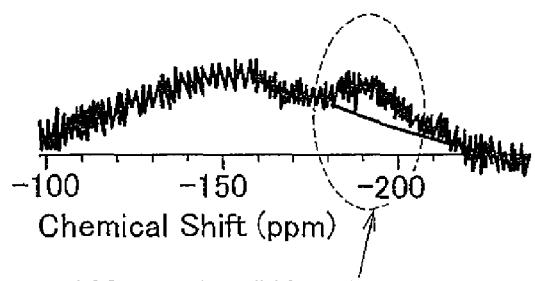
Figure 9C:
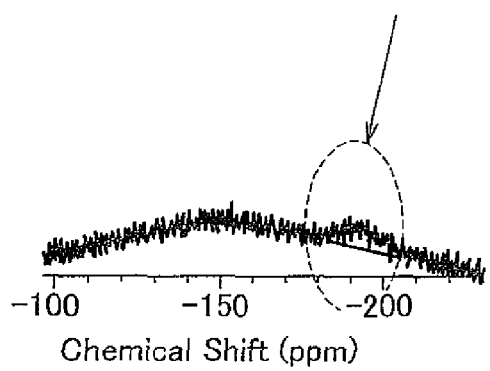
Figure 9D:
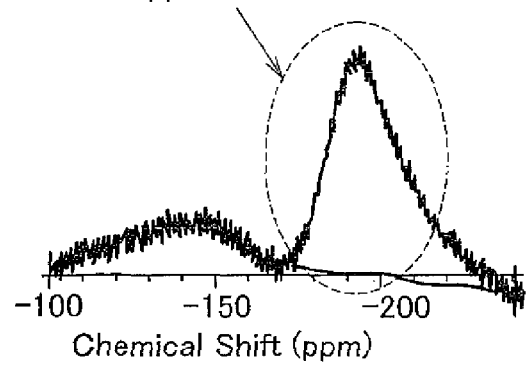
Figure 9E:
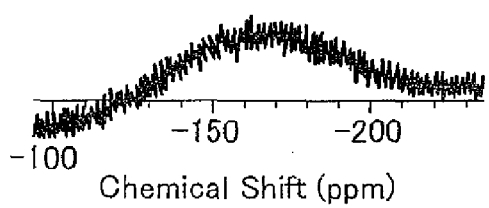
Figure 9F:
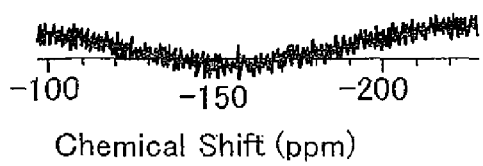
Figure 10:
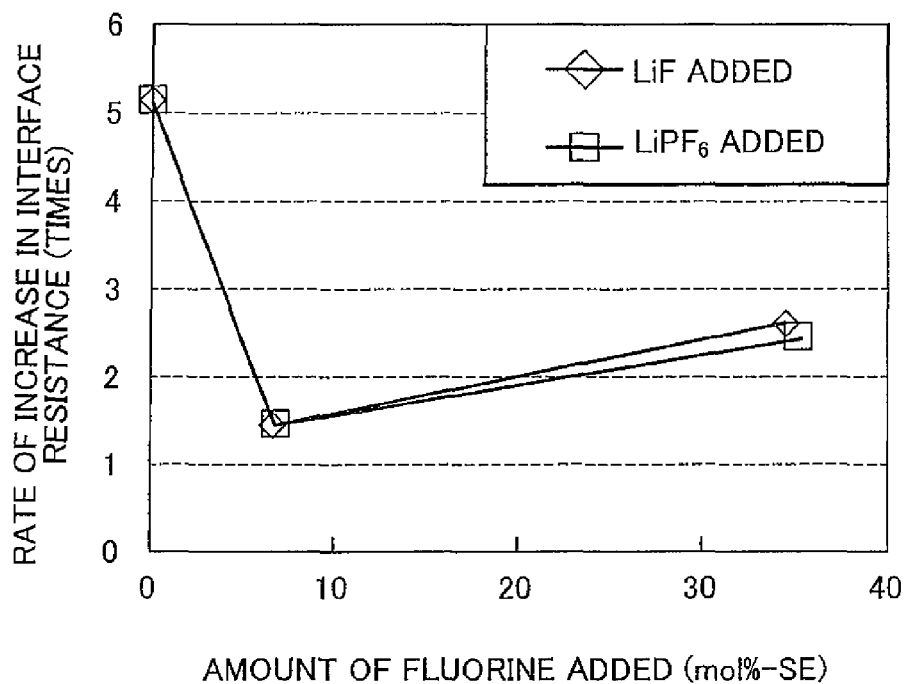
FIG. 10 is a graph that shows the relationship between an amount of fluorine added and a rate of increase in interface resistance in all-solid batteries according to the first to fourth examples and the first comparative example.
Figure 11:
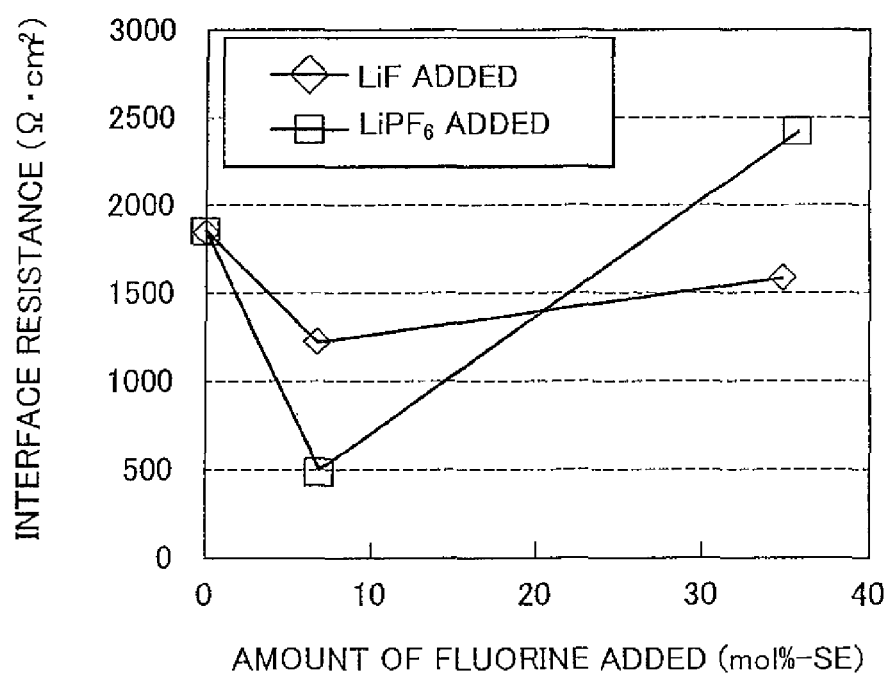
FIG. 11 is a graph that shows the relationship between an amount of fluorine added and an interface resistance (initial stage) in the all-solid batteries according to the first to fourth examples and the first comparative example.

Under the same condition as that of the first example except that no LiF was added, a solid electrolyte material was synthesized, and then an all-solid battery was manufactured.
Evaluation 1
X-ray Diffraction Measurement The solid electrolyte materials obtained in the first to fourth examples were analyzed through X-ray diffraction (Device: RINT-UltimaIII, Measurement Condition: measurement angular range of 10° to 40°, scan speed of 2°/min). The results were shown in FIG. 6. In all of the first to fourth examples, no peak that belongs to the fluoride (LiF or $LiPF_6$) was detected.
NMR Measurement The solid electrolyte materials obtained in the first to fourth examples and the first comparative example were subjected to NMR measurement. FIG. 7A to FIG. 7D respectively show the P-NMR spectra of the solid electrolyte materials according to the first to fourth examples. FIG. 8A shows the P-NMR spectrum of the solid electrolyte material according to the first comparative example. FIG. 8B shows the P-NMR spectrum of $LiPF_6$. In addition, FIG. 9A to FIG. 9F respectively show the F-NMR spectra of the solid electrolyte material according to the first to fourth examples, LiF and $LiPF_6$. According to the results of P-NMR measurement, no peak was present around 40 ppm not only in the solid electrolyte material according to the first comparative example but also in the fluoride ($LiPF_6$) used in the first and second examples; however, a new peak was observed around 40 ppm in each of the solid electrolyte materials according to the first to fourth examples. In addition, according to the results of F-NMR measurement, no peak was present around 190 ppm in the fluoride (LiF or $LiPF_6$) used in the first to fourth examples; however, a new peak was observed around 190 ppm in each of the solid electrolyte materials according to the first to fourth examples. These new peaks conceivably indicate production of a P—F bond, and this suggested that P, which is the skeletal element of each solid electrolyte material, was fluorinated.
Measurement of Interface Resistance First, the all-solid batteries obtained in the first to fourth examples and the first comparative example were charged. Charging was performed to 4.2 VvsLi at 0.1 C. After charging, the interface resistance (initial stage) between the positive electrode active material and the solid electrolyte material was obtained through impedance measurement by means of alternating-current impedance method. Impedance measurement was performed at a voltage amplitude of ±10 mV at 25° C. Then, the all-solid batteries, of which the impedances were measured, were kept for 15 days at 60° C. After that, the all-solid batteries were placed for two hours at 25° C., and, subsequently, the interface resistances (after being left at high temperatures) between the positive electrode active material and the solid electrolyte material were obtained through impedance measurement under the same condition as described above. The results were shown in FIG. 10 and FIG. 11. FIG. 10 is a graph that shows the relationship between an amount of fluorine added and a rate of increase in interface resistance (a rate of increase in interface resistance (after being left at high temperatures) with respect to an interface resistance (initial stage)). FIG. 11 is a graph that shows the relationship between an amount of fluorine added and an interface resistance (initial stage).

According to FIG. 10 and FIG. 11, it was confirmed that, in the first to fourth examples, the solid electrolyte materials contain fluorine and, therefore, an increase in interface resistance at high temperatures is suppressed. In addition, it was also confirmed that not the effect of reducing interface resistance improves as the amount of fluorine added increases but the amount of fluorine added has an optimal value. Furthermore, by comparison between the first and second examples and the third and fourth examples, it was confirmed that, when the fluoride contains the skeletal element (here, phosphorus (P)) of the solid electrolyte material, the initial interface resistance decreases.

Fifth Example

Synthesis of Solid Electrolyte Material

Lithium sulfide ($Li_2S$) and phosphorus sulfide ($P_2S_5$) were used as the material composition, and lithium hexafluorophosphate ($LiPF_6$) was used as the fluoride. The powder of them was placed in a glove box in an atmosphere of argon, and 0.3828 g $Li_2S$, 0.6172 g $P_2S_5$ and 0.001 g $LiPF_6$ were weighed and then these were mixed in an agate mortar. At this time, the ratio of $Li_2S$ and $P_2S_5$ was 75:25 on a molar basis. In addition, the amount of $LiPF_6$ added was 0.7 mole percent on a fluorine basis with respect to the solid electrolyte material to be obtained. Subsequently, the mixed composition was put into a 45 ml zirconia pot, zirconia balls were further put into the pot and then the pot was completely hermetically sealed. The pot was mounted on a planetary ball milling machine. Then, mechanical milling was performed at a rotational speed of 370 rpm for 40 hours. After that, the solid electrolyte material A ($Li_2S$—$P_2S_5$-based solid electrolyte material that contains fluorine) was obtained. In addition, under the same condition as described above except that $LiPF_6$ was not used, the solid electrolyte material B ($Li_2S$—$P_2S_5$-based solid electrolyte material that does not contain fluorine, $75Li_2S$-$25P_2S_5$) was obtained.
Synthesis of Positive Electrode Active Material Coated With Oxide Lithium ethoxide and pentaethoxyniobium were prepared as metal sources, and these metal sources were mixed in ethanol so as to coincide with the stoichiometric ratio of $LiNbO_3$. Furthermore, ethanol was added to the solution to prepare the precursor solution of $LiNbO_3$. Subsequently, the precursor solution was applied onto the surface of $LiCoO_2$ (oxide-based positive electrode active material) by a coater that uses a rolling fluidized layer. After that, heat treatment was applied in the atmosphere at 350° C. to obtain $LiCoO_2$ coated with $LiNbO_3$. $LiNbO_3$ coating $LiCoO_2$ had a coverage of 70% and a mean thickness of 10 nm.

Manufacturing of All-Solid Battery

First, the positive electrode active material and solid electrolyte material A that are obtained through the above described method were mixed at a ratio by weight of 7:3 to thereby obtain a positive electrode mixture. Subsequently, the solid electrolyte material B obtained through the above described method and graphite were mixed at a ratio by of 5:5 to thereby obtain a negative electrode mixture. Then, the power generating element 10, like the one shown in FIG. 1, was formed by a pressing machine. The above described positive electrode mixture was used for the positive electrode layer 1, the solid electrolyte material B was used for the solid electrolyte layer 3 and the above described negative electrode mixture was used for the negative electrode layer 2. The above power generating element was used to obtain an all-solid battery.

Sixth Example

Under the same condition as that of the fifth example except that the amount of $LiPF_6$ added in synthesizing the solid electrolyte material A was changed to 0.005 g (3.4 mole percent on a fluorine basis with respect to the solid electrolyte material to be obtained), an all-solid battery was obtained.

Seventh Example

Under the same condition as that of the fifth example except that the amount of $LiPF_6$ added in synthesizing the solid electrolyte material A was changed to 0.01 g (6.6 mole percent on a fluorine basis with respect to the solid electrolyte material to be obtained), an all-solid battery was obtained.

Second Comparative Example

Figure 12:
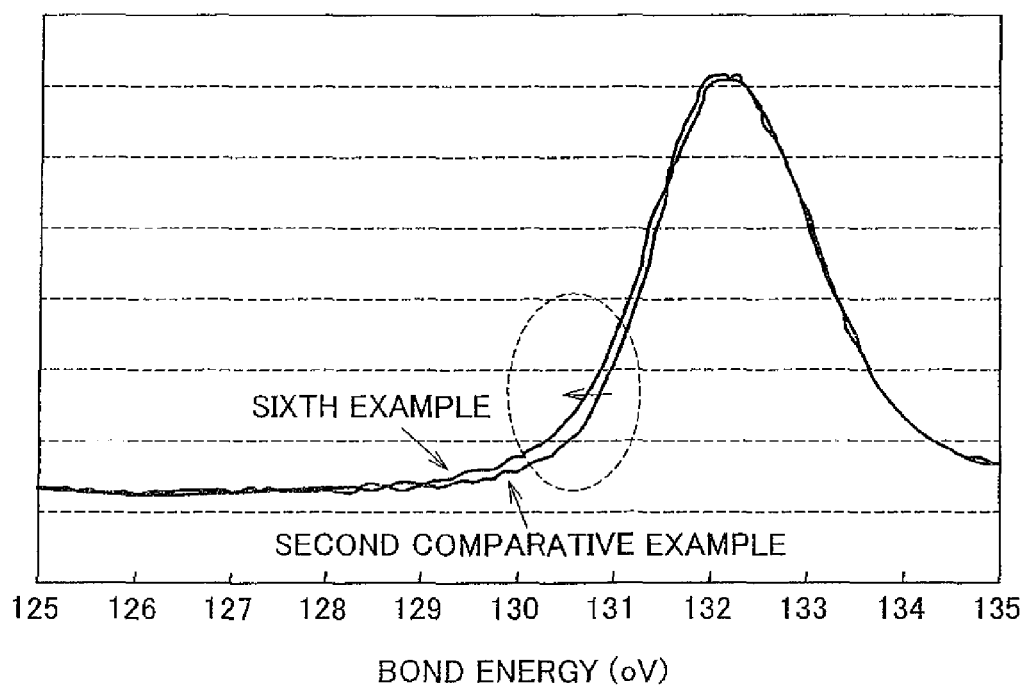
FIG. 12 is a graph that shows the XPS spectra of solid electrolyte materials A according to a sixth example and a second comparative example.
Figure 13:
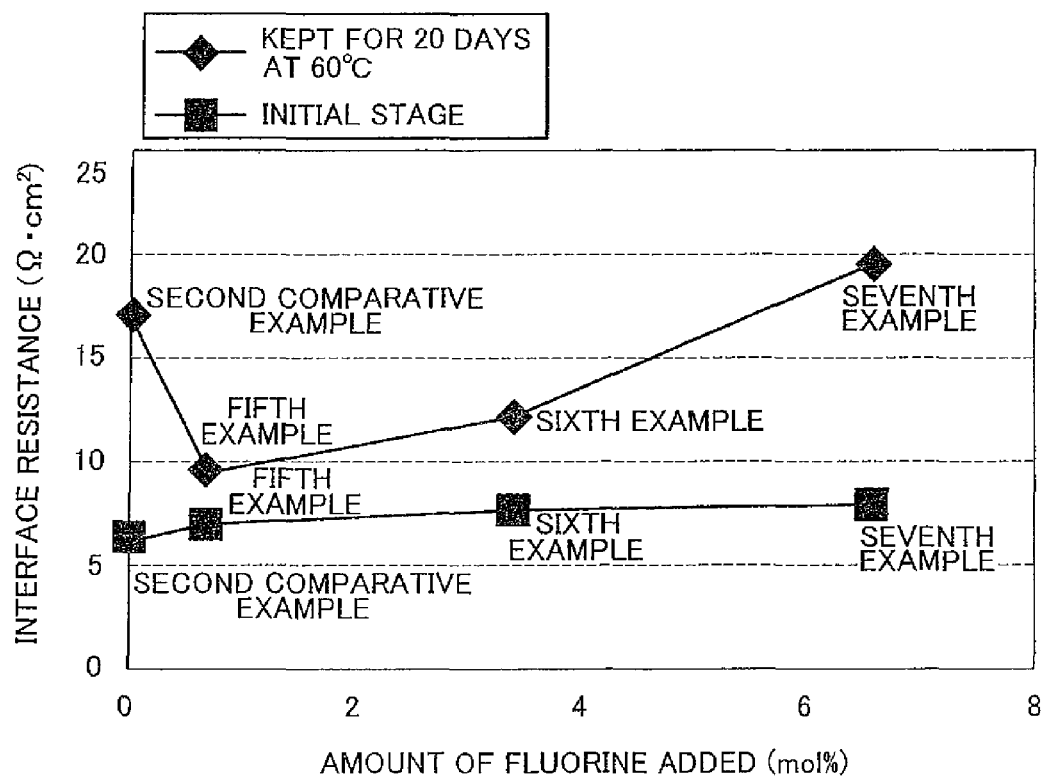
FIG. 13 is a graph that shows the relationship between an amount of fluorine added and an interface resistance in all-solid batteries according to fifth to seventh examples and the second comparative example.

Under the same condition as that of the fifth example except that no $LiPF_6$ was added in synthesizing the solid electrolyte material A, an all-solid battery was obtained.
Evaluation 2
X-ray Photoelectron Spectroscopy Measurement The solid electrolyte materials A obtained in the sixth example and the second comparative example were analyzed by XPS (Device: XPS1600 produced by Ulvac Phi, Inc., Measurement Condition: monochrome X-ray (Spot), 14 kV, 350 W, using a neutralizing gun, Measurement Range: ϕ0.4 mm). The results are shown in FIG. 12. As shown in FIG. 12, it was confirmed that the peak is shifted to a low energy side in the sixth example with respect to the peak in the second comparative example. The reason why the peak is shifted to a low energy side is conceivably because part of S in the $PS_4$ structure is replaced by F and, therefore, bonding becomes unstable to cause a peak shift. In addition, there is a conceivable possibility that a new peak appeared on a low energy side because of unstable bonding. Thus, it was confirmed that the solid electrolyte material A obtained in the sixth example is fluorinated.
Measurement of Interface Resistance The all-solid batteries obtained in the fifth to seventh examples and the second comparative example were charged. Charging was performed to 4.2 VvsLi at 0.1 C. After charging, the interface resistance (initial stage) between the positive electrode active material and the solid electrolyte material was obtained through impedance measurement by means of alternating-current impedance method. Impedance measurement was performed at a voltage amplitude of ±10 mV at 25° C. Then, the all-solid batteries, of which the impedances were measured, were kept for 20 days at 60° C. After that, the all-solid batteries were placed for two hours at 25° C., and, subsequently, the interface resistances (after being left at high temperatures) between the positive electrode active material and the solid electrolyte material were obtained through impedance measurement under the same condition as described above. The results are shown in FIG. 13. FIG. 13 is a graph that shows the relationship between an amount of fluorine added and an interface resistance.

Figure 14:
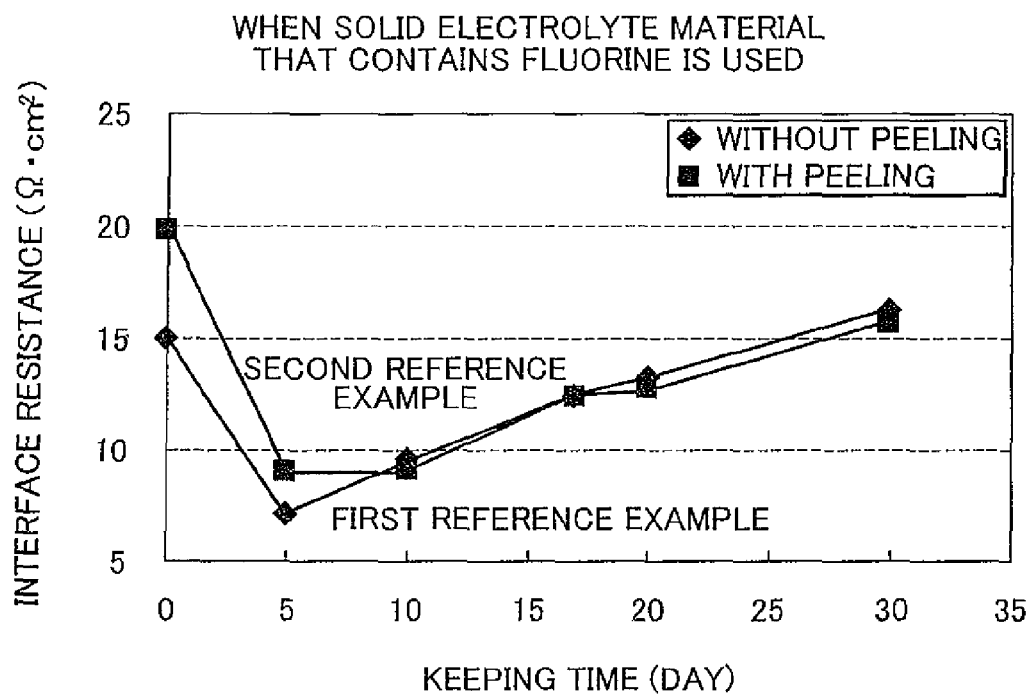
FIG. 14 is a graph that shows the relationship between a keeping time and an interface resistance in all-solid batteries according to first and second reference examples.

As is apparent from comparison between FIG. 13 and FIG. 14, it was confirmed that the values of interface resistance decrease overall in the fifth to seventh examples and the second comparative example as compared with the first to fourth examples and the first comparative example. This is conceivably because of the effect that the surface of the positive electrode active material is coated with $LiNbO_3$ that is a lithium ion conducting oxide. That is, this is conceivably because lithium ions are conducted through the inside of $LiNbO_3$ to make it possible to decrease resistance on the surface of the positive electrode active material. In addition, as shown in FIG. 13, it was confirmed that, when the amount of fluorine added (content of fluorine) is lower than or equal to 6 mole percent, the interface resistance after 20 days at 60° C. (after endurance) is equal to or lower than that of the second comparative example. This is conceivably because the fluorine contained in the solid electrolyte material. A functions as a reaction suppressing portion.

First Reference Example

First, as in the case of the fifth example, $LiCoO_2$ coated with $LiNbO_3$ (coverage 70%, mean thickness 10 nm) was synthesized. Subsequently, as in the case of the fifth example, a solid electrolyte material A ($Li_2S$—$P_2S_5$-based solid electrolyte material that contains fluorine) was obtained. Furthermore, as in the case of the fifth example, an all-solid battery was obtained.

Second Reference Example $LiCoO_2$ coated with $LiNbO_3$, obtained in the first reference example, was milled in a mortar for five minutes, and then part of $LiNbO_3$ was peeled to intentionally form a portion from which $LiCoO_2$ is exposed. Under the same condition as that of the first reference example except that the above positive electrode active material was used, an all-solid battery was obtained.

Third Reference Example

Under the same condition as that of the first reference example except that the solid electrolyte material B ($Li_2S$—$P_2S_5$-based solid electrolyte material that does not contain fluorine, $75Li_2S$-$25P_2S_5$) in the fifth example was used as the solid electrolyte material for the positive electrode layer, an all-solid battery was obtained.

Fourth Reference Example $LiCoO_2$ coated with $LiNbO_3$, obtained in the first reference example, was milled in a mortar for five minutes, and then part of $LiNbO_3$ was peeled to intentionally form a portion from which $LiCoO_2$ is exposed. Under the same condition as that of the third reference example except that the above positive electrode active material was used, an all-solid battery was obtained.

Evaluation 3

Measurement of Interface Resistance

Figure 15:
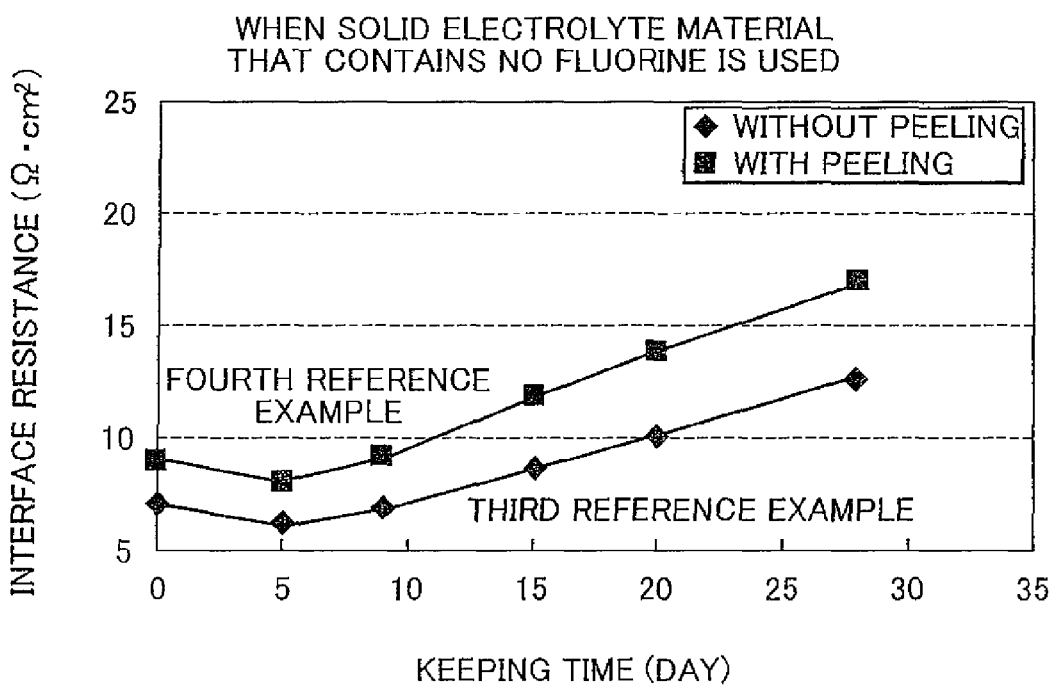
FIG. 15 is a graph that shows the relationship between a keeping time and an interface resistance in all-solid batteries according to third and fourth reference examples.

The ail-solid batteries obtained in the first to fourth reference examples were charged. Charging was performed to 4.2 VvsLi at 0.1. C. After charging, the interface resistance (initial stage) between the positive electrode active material and the solid electrolyte material was obtained through impedance measurement by means of alternating-current impedance method. Impedance measurement was performed at a voltage amplitude of ±10 mV at 25° C. Then, the all-solid batteries, of which the impedances were measured, were kept for 30 days at 60° C., and then changes over time in interface resistance were measured. When the interface resistance was measured, each of the all-solid batteries was placed at 25° C. for two hours, and, subsequently, the interface resistance value (after being left at high temperatures) between the positive electrode active material and the solid electrolyte material was obtained through impedance measurement of the same condition as described above. The results are shown in FIG. 14 and FIG. 15.

As shown in FIG. 14, when the solid electrolyte materials that contain fluorine were used, the slopes of the interface resistances were substantially equal irrespective of presence or absence of peeling of $LiNbO_3$. This is conceivably because a fluoride is produced on the surface of the positive electrode active material exposed through peeling to thereby make it possible to suppress production of a high-resistance portion. On the other hand, as shown in FIG. 15, when the solid electrolyte materials that do not contain fluorine were used, the slopes of the interface resistances increased because of peeling of $LiNbO_3$. This is conceivably because the solid electrolyte material contacts the surface of the positive electrode active material exposed through peeling to cause interdiffusion to occur between both components to thereby produce a high-resistance portion. From the above, it was confirmed that the solid electrolyte material that contains fluorine is used to make it possible to suppress production of a high-resistance portion at the interface between the positive electrode active material and the solid electrolyte material.

The invention claimed is:

1. An electrode element, comprising:
   an electrode active material that is an oxide-based active material; and
   a solid electrolyte material that can react with the electrode active material to form a high-resistance portion, wherein
   the solid electrolyte material includes fluorine;
   the solid electrolyte material is a sulfide-based solid electrolyte material;
   the content of the fluorine ranges from 0.1 mole percent to 20 mole percent with respect to the solid electrolyte material;
   the solid electrolyte material has a peak around 190 ppm in F-NMR;
   the solid electrolyte material contains phosphorus as a skeletal element;
   the solid electrolyte material has a peak around 40 ppm in P-NMR;
   a surface of the electrode active material is coated with an oxide;
   the solid electrolyte material is obtained by amorphizing a mixture containing $Li_2S$, $P_2S_5$, and a fluoride; and
   a ratio of $Li_2S$ and $P_2S_5$ in the mixture ranges from 72:28 to 78:22.

2. The electrode element according to claim 1, wherein part of the solid electrolyte material is fluorinated.

3. The electrode element according to claim 1, wherein the solid electrolyte material is amorphous.

4. The electrode element according to claim 1, wherein the oxide is an ion-conducting oxide.

5. The electrode element according to claim 4, wherein the ion-conducting oxide is lithium niobate.

6. An all-solid battery comprising:
   a positive electrode layer;
   a negative electrode layer; and
   a solid electrolyte layer that is formed between the positive electrode layer and the negative electrode layer, wherein
   at least one of the positive electrode layer, the negative electrode layer and the solid electrolyte layer is the electrode element according to claim 1.

7. The all-solid battery according to claim 6, wherein the positive electrode layer is the electrode element according to claim 1.

8. A manufacturing method for the electrode element according to claim 1, comprising:
   adding a fluoride to a material composition that contains $Li_2S$ and $P_2S_5$ wherein the fluoride added ranges from 0.1 mole percent to 20 mole percent on a fluorine basis;
   amorphizing the material composition to which the fluoride has been added to obtain the solid electrolyte material; and
   mixing the solid electrolyte material with an oxide-based active material.

9. The manufacturing method according to claim 8, wherein the fluoride contains a skeletal element of the solid electrolyte material.

10. The electrode element according to claim 1, wherein the solid electrolyte material does not substantially contain $Li_2S$.

11. The electrode element according to claim 1, wherein the solid electrolyte material does not substantially contain bridging sulfur.

12. The electrode element according to claim 10, wherein the solid electrolyte material does not substantially contain bridging sulfur.

* * * * *